US010620789B2

(12) United States Patent
Allington et al.

(10) Patent No.: US 10,620,789 B2
(45) Date of Patent: Apr. 14, 2020

(54) USER INTERFACE DRIVEN MOVEMENT OF DATA

(71) Applicant: Microsoft Technology Licensing, LLC, Redmond, WA (US)

(72) Inventors: Clea Allington, Seattle, WA (US); Cindy Kwan, Bellevue, WA (US); Joseph T. Flint, Redmond, WA (US); Flora M. Lee, Seattle, WA (US); Poonam G. Hattangady, Seattle, WA (US); Justin Son Pae, Mercer Island, WA (US); Jaime J. Hwacinski, Sammamish, WA (US); Spencer K. Nelson, Bellevue, WA (US); Joan Ching Li, Seattle, WA (US); Eva Britta Karolina Burlin, Redmond, WA (US); Ian Dwyer Curry, Seattle, WA (US); Anna Pablo, Seattle, WA (US); Andrew Winslow Brough, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 15/432,029

(22) Filed: Feb. 14, 2017

(65) Prior Publication Data
US 2018/0004366 A1 Jan. 4, 2018

Related U.S. Application Data

(60) Provisional application No. 62/356,321, filed on Jun. 29, 2016.

(51) Int. Cl.
*G06F 3/0482* (2013.01)
*G06Q 10/10* (2012.01)
*G06F 3/0488* (2013.01)

(52) U.S. Cl.
CPC ........ *G06F 3/0482* (2013.01); *G06F 3/04883* (2013.01); *G06Q 10/1093* (2013.01)

(58) Field of Classification Search
CPC .............. G06F 3/0482; G06F 3/04883; G06Q 10/1093; G06Q 10/109; Y10S 715/963
See application file for complete search history.

(56) References Cited

U.S. PATENT DOCUMENTS

| 5,899,979 A * | 5/1999 | Miller ................ G06Q 10/1097 705/7.21 |
| 8,127,240 B2 | 2/2012 | Grotjohn et al. |

(Continued)

FOREIGN PATENT DOCUMENTS

EP    2096587 A1    9/2009

OTHER PUBLICATIONS

"Set default calendar", Retrieved on: Sep. 14, 2016 Available at: https://support.office.com/en-us/article/Set-default-calendar-7c546486-0c7c-4870-964a-0d6eb4de83e0.

(Continued)

*Primary Examiner* — Jennifer N To
*Assistant Examiner* — Amy P Hoang
(74) *Attorney, Agent, or Firm* — Christopher J. Volkmann; Kelly, Holt & Christenson, PLLC

(57) ABSTRACT

A to-do list management system surfaces a user interface with a user input mechanism that displays a user actuatable element for each item on a user's to-do list. It senses a flick gesture and automatically moves a to-do list item to the user's agenda. It can also sense a user input gesture and automatically remove an agenda item from the user's agenda, and place it on the user's to-do list.

20 Claims, 27 Drawing Sheets

(56) References Cited

U.S. PATENT DOCUMENTS

| | | | |
|---|---|---|---|
| 8,381,106 | B2 | 2/2013 | Bauer et al. |
| 8,799,808 | B2 | 8/2014 | Satterfield et al. |
| 8,839,155 | B2 | 9/2014 | Ording |
| 9,021,270 | B1 | 4/2015 | Byers et al. |
| 9,100,776 | B2 | 8/2015 | Basir |
| 9,202,205 | B2 | 12/2015 | Kothari |
| 9,261,985 | B2 | 2/2016 | Hicks |
| 9,317,825 | B2 | 4/2016 | Defusco et al. |
| 2005/0091578 | A1 | 4/2005 | Madan et al. |
| 2009/0158186 | A1 | 6/2009 | Bonev et al. |
| 2011/0173221 | A1 | 7/2011 | Ahiakpor et al. |
| 2012/0262462 | A1 | 10/2012 | Montan et al. |
| 2013/0151987 | A1 | 6/2013 | Flynn, III et al. |
| 2013/0212492 | A1 | 8/2013 | Chen et al. |
| 2014/0071074 | A1 | 3/2014 | Cousins et al. |
| 2014/0143738 | A1 | 5/2014 | Underwood, IV et al. |
| 2014/0278666 | A1 | 9/2014 | Cook et al. |
| 2014/0306897 | A1 | 10/2014 | Cueto |
| 2015/0143258 | A1 | 5/2015 | Carolan et al. |
| 2015/0161569 | A1 | 6/2015 | Shoham et al. |
| 2015/0212684 | A1 | 7/2015 | Sabia et al. |
| 2015/0346916 | A1 | 12/2015 | Jisrawi et al. |
| 2015/0379476 | A1 | 12/2015 | Chaudhri et al. |
| 2016/0216862 | A1* | 7/2016 | Turner ................. G06F 3/0488 |
| 2016/0350719 | A1* | 12/2016 | Wang ................. G06Q 10/1095 |
| 2017/0061393 | A1* | 3/2017 | Park ................. G06Q 10/1093 |
| 2017/0063867 | A1* | 3/2017 | Singh ................. H04L 63/102 |

OTHER PUBLICATIONS

Patterson, Ben, "10 gotta-know calendar tips for iOS", Published on: Jun. 3, 2015 Available at: http://www.macworld.com/article/2928281/10-gotta-know-calendar-tips-for-ios.html.

"Roadmaps Portfolio Timeline View ", Retrieved on: Sep. 14, 2016 Available at: https://community.versionone.com/VersionOne-Lifecycle/The_Agile_Process/Portfolio_Planning/Strategic_Planning/About_Roadmaps/Roadmaps_Portfolio_Timeline_View.

Tse, Matthew, "Introducing Power-Ups: Calendar, Card Aging, and More", Published on: Aug. 7, 2013 Available at: http://blog.trello.com/introducing-power-ups-calendar-card-aging-and-more/.

"Using the Calendar", Published on: Jul. 1, 2016 Available at: https://www.getflow.com/support/projects/calendar/.

"Turn Your Evernote Notes (without reminders) Into Google Calendar Events (quick add events)", Published on: Mar. 29, 2015 Available at: https://zapier.com/zapbook/zaps/70/turn-your-evernote-notes-into-google-calendar-events/.

"Calendar (El Capitan): Add, modify, or delete events", Retrieved on: Sep. 14, 2016 Available at: https://support.apple.com/kb/PH22703?locale=en_US. 3 pages.

"Move an Email Message to a Calendar Appointment", Published on: Aug. 7, 2013 Available at: http://agsci.psu.edu/it/how-to/move-an-email-message-to-calendar-appointment.

"Move an Email Message to a Calendar Appointment", Published on: Aug. 7, 2013 Available at: http://agsci.psu.edu/it/how-to/move-an-email-message-to-calendar-appointment. 1 page.

Tanasychuk, et al., "How to add and manage calendar vents on iPhone and iPad", Published on: Apr. 10, 2016 Available at: http://www.imore.com/how-manage-calendar-events-iphone-and-ipad#links. 13 pages.

"Calendar (El Capitan) Move events to another calendar", Retrieved on: Sep. 14, 2016 Available at: https://support.apple.com/kb/PH22711?locale=en_US&viewlocale=en_US. 1 pages.

Negrino, Tom, "Working with Calendars and Reminders in iCloud", Published on: Mar. 15, 2012 Available at: http://www.peachpit.com/articles/article.aspx?p=1829132. 5 pages.

Pinola, Melanie, "Evernote's Missing Feature: How to Add Reminders to Your Notes", Published on: May 17, 2013 Available at: http://lifehacker.com/evernotes-missing-feature-how-to-add-reminders-to-your-508195172. 5 pages.

"Call function when SwipeGestureRecognizer swipe speed passes threshold", Published on: Oct. 7, 2015 Available at: http://stackoverflow.com/questions/29635709/call-function-when-swipegesturerecognizer-swipe-speed-passes-threshold. 2 pages.

* cited by examiner

USER INTERFACE DRIVEN MOVEMENT OF DATA

CROSS-REFERENCE TO RELATED APPLICATION

The present application is based on and claims the benefit of U.S. provisional patent application Ser. No. 62/356,321, filed Jun. 29, 2016, the content of which is hereby incorporated by reference in its entirety.

BACKGROUND

Computing systems are currently in wide use. Some computing systems include such things as a calendar or agenda management computing system, a to-do list management computing system, among a wide variety of others.

A calendar or agenda management computing system surfaces a user interface, with user input mechanisms, that allow a user to perform calendar or agenda operations. Such operations can include things like entering an agenda item on the user's agenda. The agenda may include a calendar where each day on the calendar is divided into multiple different times. Entering an agenda item may include entering a description of the agenda item at a particular time on a particular day on the user's calendar or agenda. When the user pulls up his or her agenda (by activating the calendar or agenda management computing system), the user can see his or her agenda items, and when they are to occur (e.g., when they are scheduled), on the various days of the user's calendar.

A to-do list management system surfaces a user interface, with user input mechanisms, that allow a user to perform to-do list management functions. Such functions can include entering items on the user's to-do list, deleting items, marking them as completed, among a wide variety of other things.

The discussion above is merely provided for general background information and is not intended to be used as an aid in determining the scope of the claimed subject matter.

SUMMARY

A to-do list management system surfaces a user interface with a user input mechanism that displays a user actuatable element for each item on a user's to-do list. It senses a flick gesture and automatically moves a to-do list item to the user's agenda. It can also sense a user input gesture and automatically remove an agenda item from the user's agenda, and place it on the user's to-do list.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
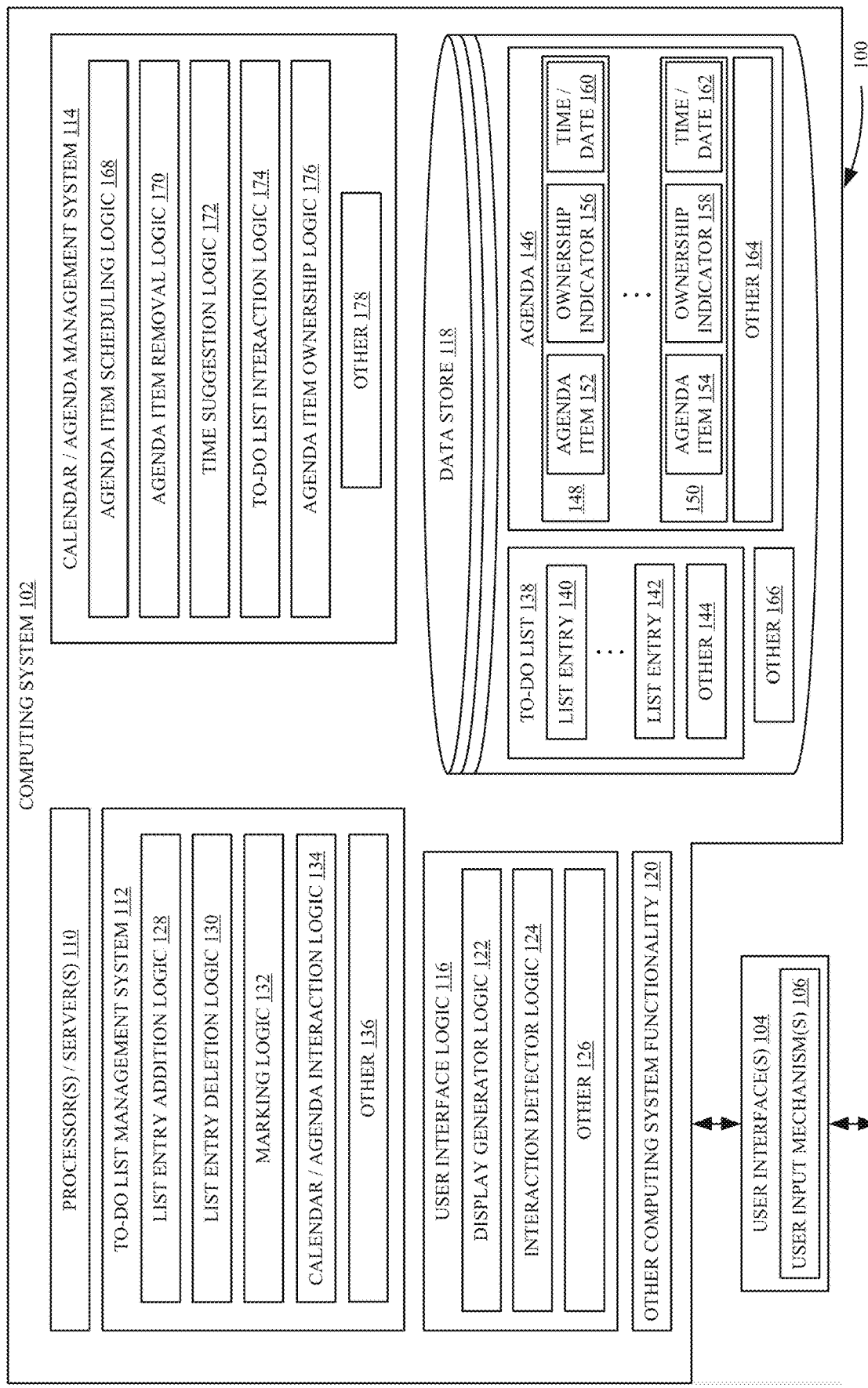
FIG. 1 is a block diagram of one example of a computing system architecture.

FIG. 1 is a block diagram of one example of a computing system architecture 100. Architecture 100 shows computing system 102 generating user interfaces 104 with user input mechanisms 106 for interaction by user 108. User 108 illustratively interacts with user input mechanisms 106 in order to control and manipulate computing system 102.

In the example shown in FIG. 1, computing system 102 illustratively includes one or more processors or servers 110, to-do list management system 112, calendar/agenda management system 114, user interface logic 116, data store 118, and it can include a wide variety of other computing system functionality 120. User interface logic 116 illustratively includes display generator logic 122, interaction detector logic 124, and it can include other items 126. User interface logic 116 illustratively uses display generator logic 122 to generate user interface displays 104, with user input mechanisms 106. It can do this on its own or under the control of other items in computing system 102. Interaction detector logic 124 illustratively detects user interaction, by user 108, with user input mechanisms 106, and generates a signal indicative of those interactions and can provide that signal to other items in computing system 102, or elsewhere. Some examples of user interactions and user input mechanisms are described in greater detail below.

A user's to-do list can be stored as to-do list 138 in data store 118. Each to-do list can have a plurality of different list entries 140-142, and it can include a wide variety of other items 144. To-do list management system 112 is illustratively a computing system (or application) that includes functionality for generating and/or surfacing user interfaces with user input mechanisms that allow user 108 to perform to-do list management functions. For instance, system 112 can include list entry addition logic 128, list entry deletion logic 130, marking logic 132, calendar/agenda interaction logic 134, and it can include other items 136. List entry addition logic 128 illustratively generates user interfaces with user input mechanisms that allow user 108 to add list entries (140-142) to the user's to-do list 138.

List entry deletion logic 130 illustratively generates user interfaces with user input mechanisms that allow user 108 to delete list entries (140-142) from the user's to-do list 138. Marking logic 132 illustratively generates user interfaces with user input mechanisms that allow user 108 to mark list entries in various ways (such as to mark them urgent, to mark them completed, etc.).

Calendar/agenda interaction logic 134 illustratively interacts with calendar/agenda management system 114 in order to remove list entries from the user's to-do list 138 and to enter them on the user's agenda 146 based on detected user inputs.

A user's agenda 146 may also be stored in data store 118, and it may include a plurality of different agenda items 148-150. Each agenda item can include a description portion 152-154 that describes the agenda item, an ownership indicator 156-158 that describes who created the agenda item, and a time/date portion 160-162 that indicates a time and a date on which the agenda item is scheduled. Some examples of a user's agenda are described in greater detail below as well. It will be noted that agenda 146 can include other items 164, and data store 118 can also include other items 166.

Calendar/agenda management system 114 illustratively includes agenda item scheduling logic 168, agenda item removal logic 170, time suggestion logic 172, to-do list interaction logic 174, agenda item ownership logic 176, and it can include other items 178. Agenda item scheduling logic 168 illustratively generates and/or surfaces a user interface, with user input mechanisms, that allow user 108 to place agenda items on the user's schedule or agenda. Agenda item removal logic 170 illustratively generates user input mechanisms that allow the user to remove items from the user's schedule or agenda. Time suggestion logic 172 illustratively generates a user interface with user input mechanisms that allow the user to request and view suggested times on which an agenda item may be scheduled. The suggested times may include specific times, such as a specific hour or minute of a day, or they may include more general times, such as the morning of a certain day, a day of a certain week, etc. Thus, an agenda item may simply be placed on a day and have no specific time associated with it. On the other hand, it may be placed on a particular day and have a specific time associated with it. Similarly, it may be placed on a day of a week, but it may be carried forward to each day of that week, until it is marked as completed. It may be placed on a portion of a day (such as a morning of a day or an afternoon or evening of a day) but not have a specific hour associated with it. All of these and other scenarios are contemplated herein, and all of these options may be suggested by time suggestion logic 172 based on the user's availability or based on various other circumstances or criteria.

To-do list interaction logic 174 illustratively interacts with calendar/agenda interaction logic 134 in order to automatically move an agenda item from the user's agenda 146 to the user's to-do list 148, based upon a detected user input. Some examples of this are described in greater detail below.

Agenda item ownership logic 176 illustratively tracks the ownership of an agenda item that is on the user's agenda 146. For instance, the owner of an agenda item may be a particular user that created the agenda item. The owner may be identified in other ways as well. It may be that the owner has different permissions from other people. For instance, the owner of an agenda item may be the only one who can change the agenda item. This is only one example and different permissions can vary widely as well.

Figure 1A:
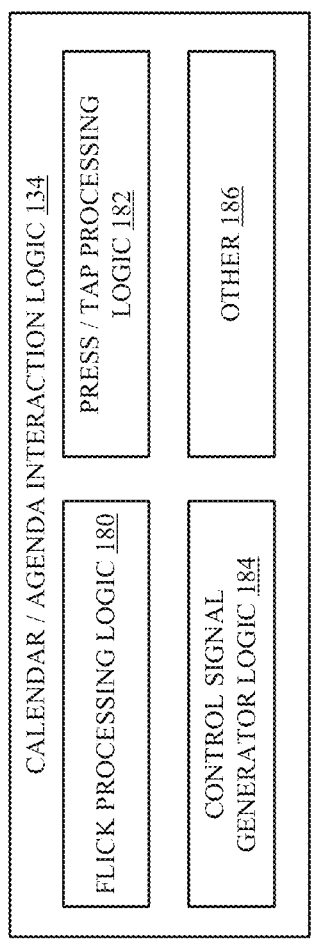
FIG. 1A is a block diagram showing one example of calendar/agenda interaction logic in more detail.
Figure 1B:
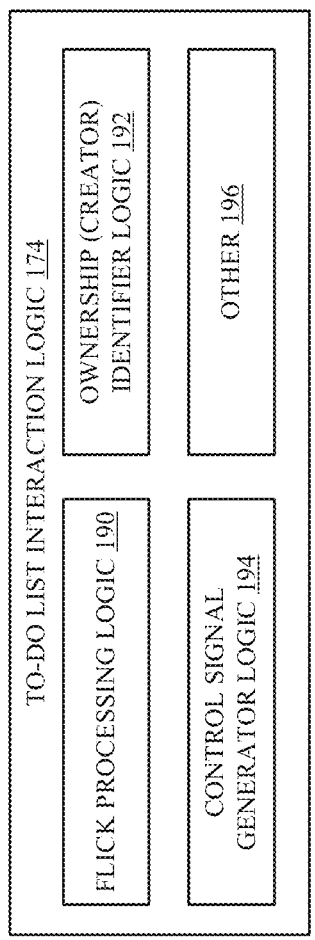
FIG. 1B is a block diagram showing one example of to-do list interaction logic in more detail.

Before describing the overall operation of architecture 100 in more detail, examples of a more detailed description of calendar/agenda interaction logic 134, and to-do list interaction logic 174 will now be provided with respect to FIGS. 1A and 1B. FIG. 1A shows that calendar/agenda interaction logic 134 illustratively includes flick processing logic 180, press/tap processing logic 182, control signal generator logic 184, and it can include a wide variety of other things 186. Flick processing logic 180 identifies processing steps to take when interaction detector logic 124 (shown in FIG. 1) detects that the user has provided a flick input on one of user input mechanisms 106. The flick input may be distinguished from a tap or press input in that the flick input illustratively occurs when a user touches a user actuatable element on a screen, and slides his or her finger rapidly in a single direction (such as left, right, up or down, etc.). For purposes of the present discussion, the flick gesture may also include a slide gesture in which the user moves his or her finger in one of those directions relatively slowly. However, a tap or press gesture is detected when the user touches or touches and holds (substantially without moving his or her finger in a particular direction) a user actuatable element on a user interface display. Press/tap processing logic 182 illustratively identifies actions to be taken when interaction detection logic 124 detects that the user has pressed or tapped on a user actuatable element.

Both flick processing logic 180 and press/tap processing logic 182 illustratively control signal generator logic 184 to generate control signals that can be used to control other portions of computing system 102, based upon the detected user inputs. For instance, in one example, control signal generator logic 184 can generate control signals to control calendar/agenda management system 114 to automatically move an item represented by a to-do list entry onto the user's calendar or agenda. In doing so, it can control calendar/agenda management system 114 (and specifically agenda item scheduling logic 168) to generate an agenda item and place it on the user's schedule. It can also illustratively generate control signals to control time suggestion logic 172 to receive suggested times for scheduling the agenda item. Similarly, tap/press processing logic 182 can use control signal generator logic 184 to generate control signals to control agenda item scheduling logic 168 to move an item from the user's to-do list to the user's agenda based upon the user tapping or pressing a calendar button on the to-do list display. All of these and other examples are discussed in greater detail below.

FIG. 1B illustrates an example in which to-do list interaction logic 174 includes flick processing logic 190, ownership (creator) identifier logic 192, control signal generator logic 194, and it can include other items 196. When calendar/agenda management system 114 is displaying the user's calendar or agenda, flick processing logic 190 illustratively identifies steps to take in response to a flick gesture detected by interaction detector logic 124, on a user actuatable element on the display. Ownership (creator) identifier logic 192 illustratively identifies and maintains the ownership of the various items on the user's agenda (such as who created those items, etc.). Flick processing logic 190 can access ownership identifier logic 192 to identify the owner of an agenda item represented by a user actuatable element, with which the user has interacted. It can also illustratively use control signal generator logic 194 to generate control signals to control other portions of computing system 102, based upon the detected flick gesture.

By way of example, if a user flicks a user actuatable element representing an agenda item in a particular direction, then flick processing logic 190 may identify that the user wishes to move that agenda item to the user's to-do list. It can then use control signal generator logic 194 to generate one or more control signals that interact with calendar/agenda interaction logic 194, to control to-do list management system 112 to create a list entry corresponding to the agenda item and add it to the user's to-do list. In doing so, it can control list entry addition logic 128. These and other examples are described in greater detail below.

Figure 2A:
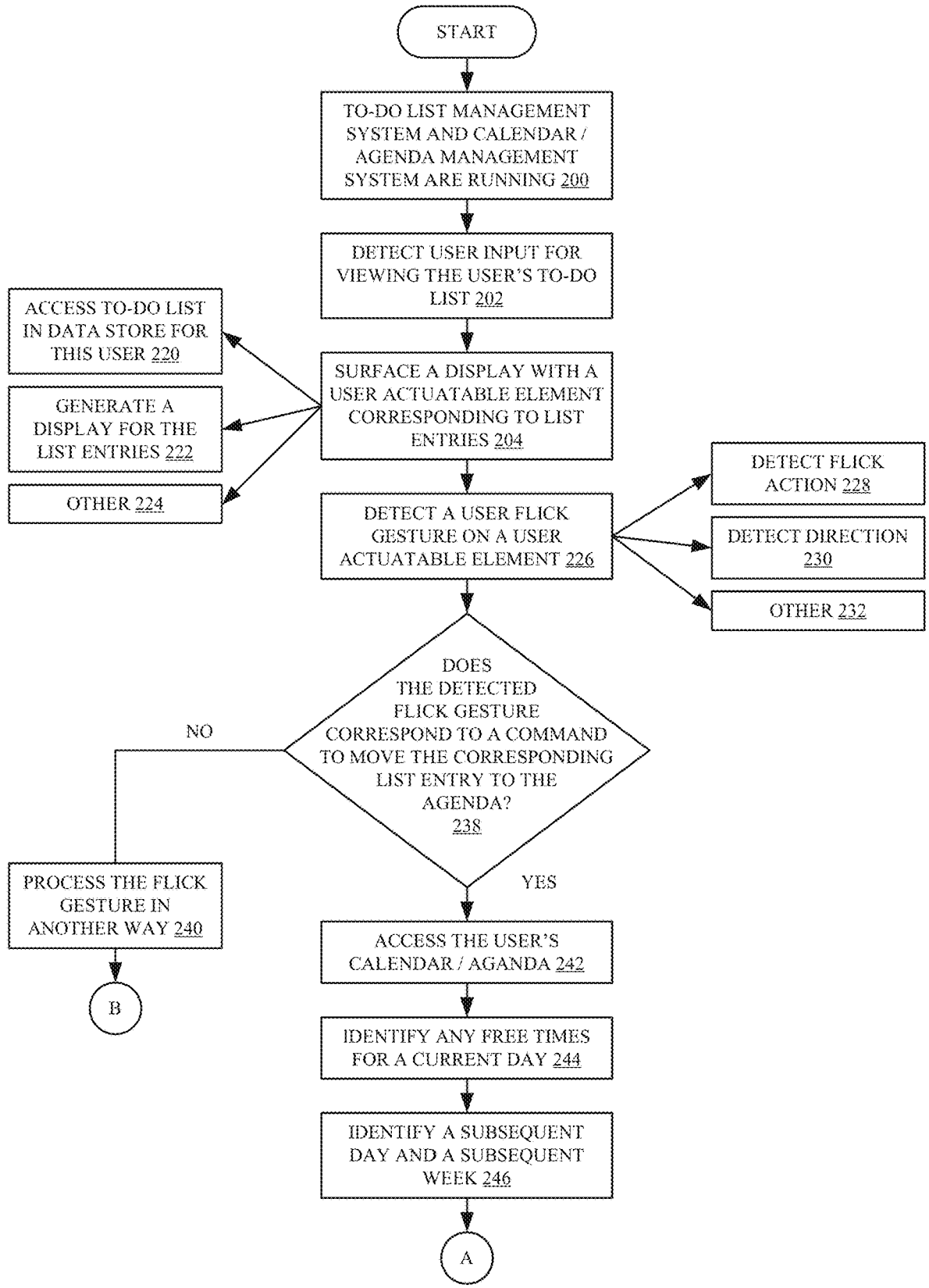
FIGS. 2A and 2B (collectively referred to herein as FIG. 2) illustrate a flow diagram showing the operation of the architecture illustrated in FIG. 1 in moving a to-do list item to a user's agenda.
Figure 2B:
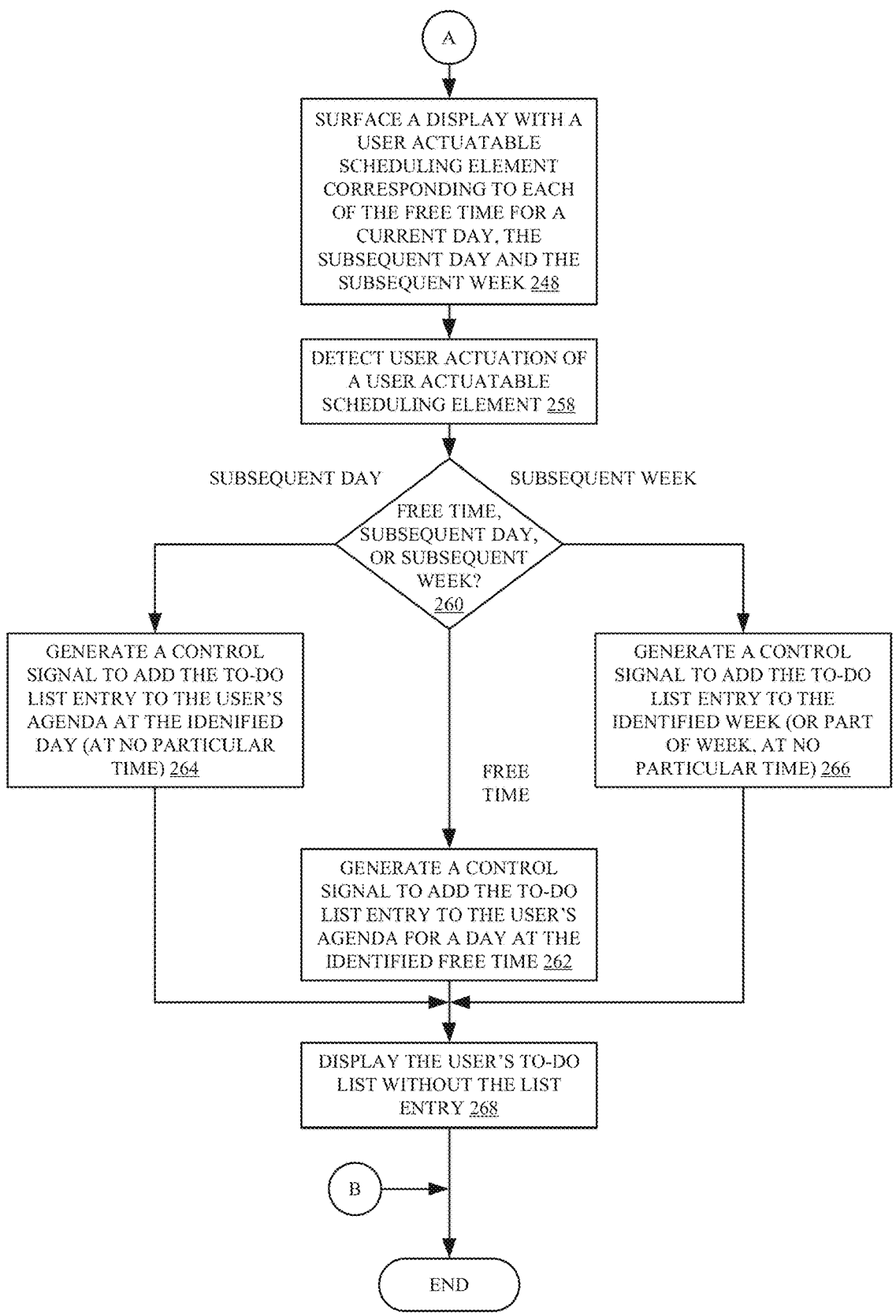

FIGS. 2A and 2B (collectively referred to herein as FIG. 2) illustrate a flow diagram showing one example of the operation of computing system architecture 100 in detecting and processing user inputs with respect to data on the user's to-do list 138 and/or the user's agenda 146. FIG. 2 specifically describes an example in which the user automatically moves a list entry from the user's to-do list to the user's agenda, where an agenda item is created and placed on the user's agenda, in response to a user input.

It is first assumed that to-do list management system 112 and calendar/agenda management system 114 are running and can access one another. If not, they can be launched, as needed. This is indicated by block 200 in the flow diagram of FIG. 2.

Interaction detector logic 124 then detects a user input indicating that user 108 wishes to view the user's to-do list 138. This is indicated by block 202. This can be any of a wide variety of different types of user inputs, such as touching an actuator or icon, such as navigating to the user's to-do list, or such as touching a button or any of a wide variety of other user input mechanisms.

Figure 3A:
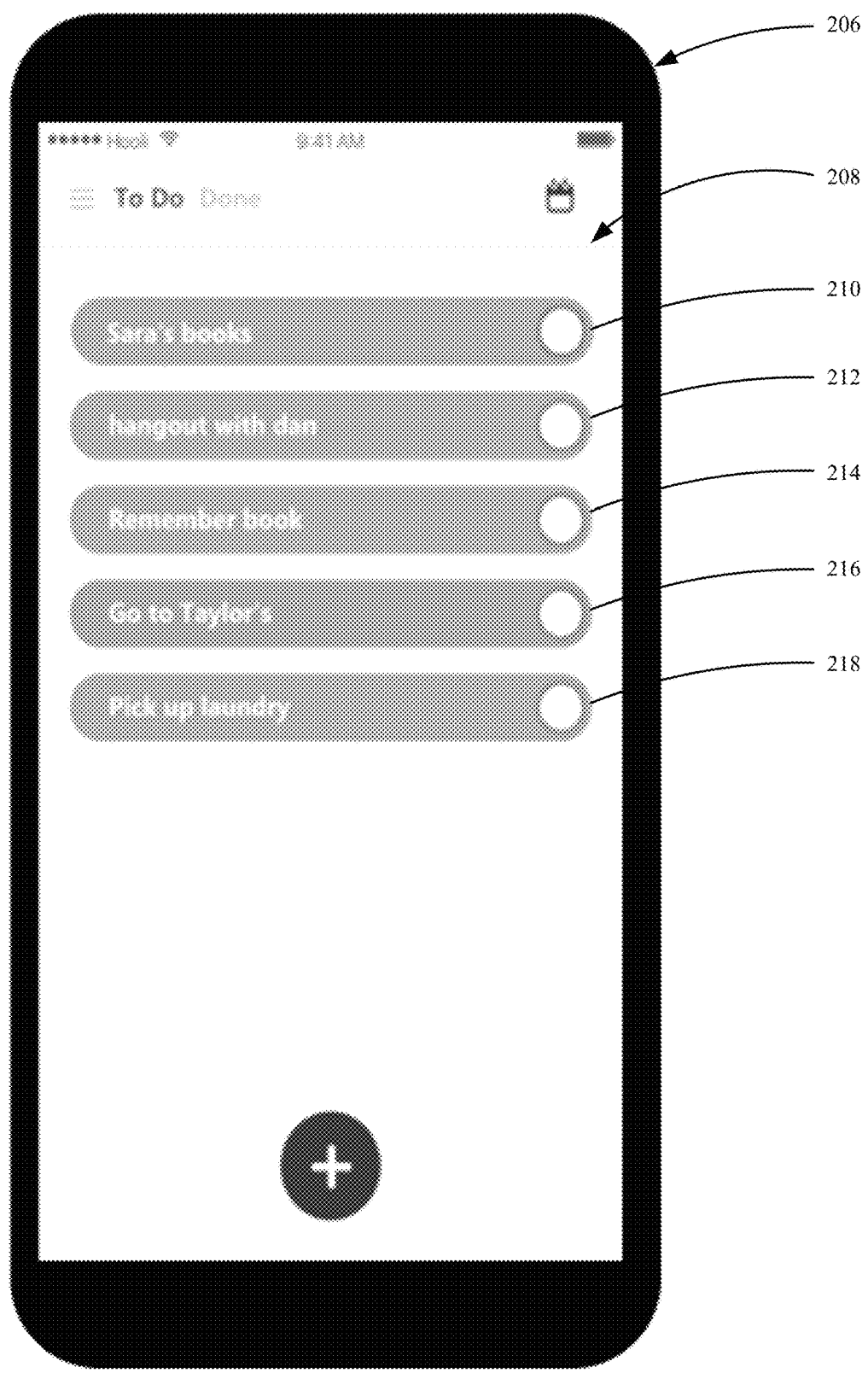
FIGS. 3A-3D show examples of user interface displays.

To-do list management system 112 then accesses the user's to-do list 138 and surfaces a display with user actuatable elements corresponding to the entries on the user's to-do list 138. This is indicated by block 204. FIG. 3A, for instance, shows one example of this. In FIG. 3A, a mobile device 206 is displaying a to-do list display 208. The to-do list display 208 shows a user actuatable element (210-218) corresponding to each of a plurality of items on the user's to-do list. Accessing the to-do list 138 in data store 118 is indicated by block 220 in the flow diagram of FIG. 2. Generating a display for the list entries is indicated by block 222. It will be understood that the display shown in FIG. 3A is only one example of such a display, and others could be generated as well. This is indicated by block 224.

Interaction detector logic 124 then illustratively detects a user flick gesture on one of the user actuatable elements 210-218. This is indicated by block 226. In one example, interaction detector logic 124 detects the flicking action as indicated by block 228 and also detects a direction corresponding to movement of the user's finger, during the gesture. This is indicated by block 230. The flick gesture can be detected in other ways as well, and this is indicated by block 232.

Figure 3B:
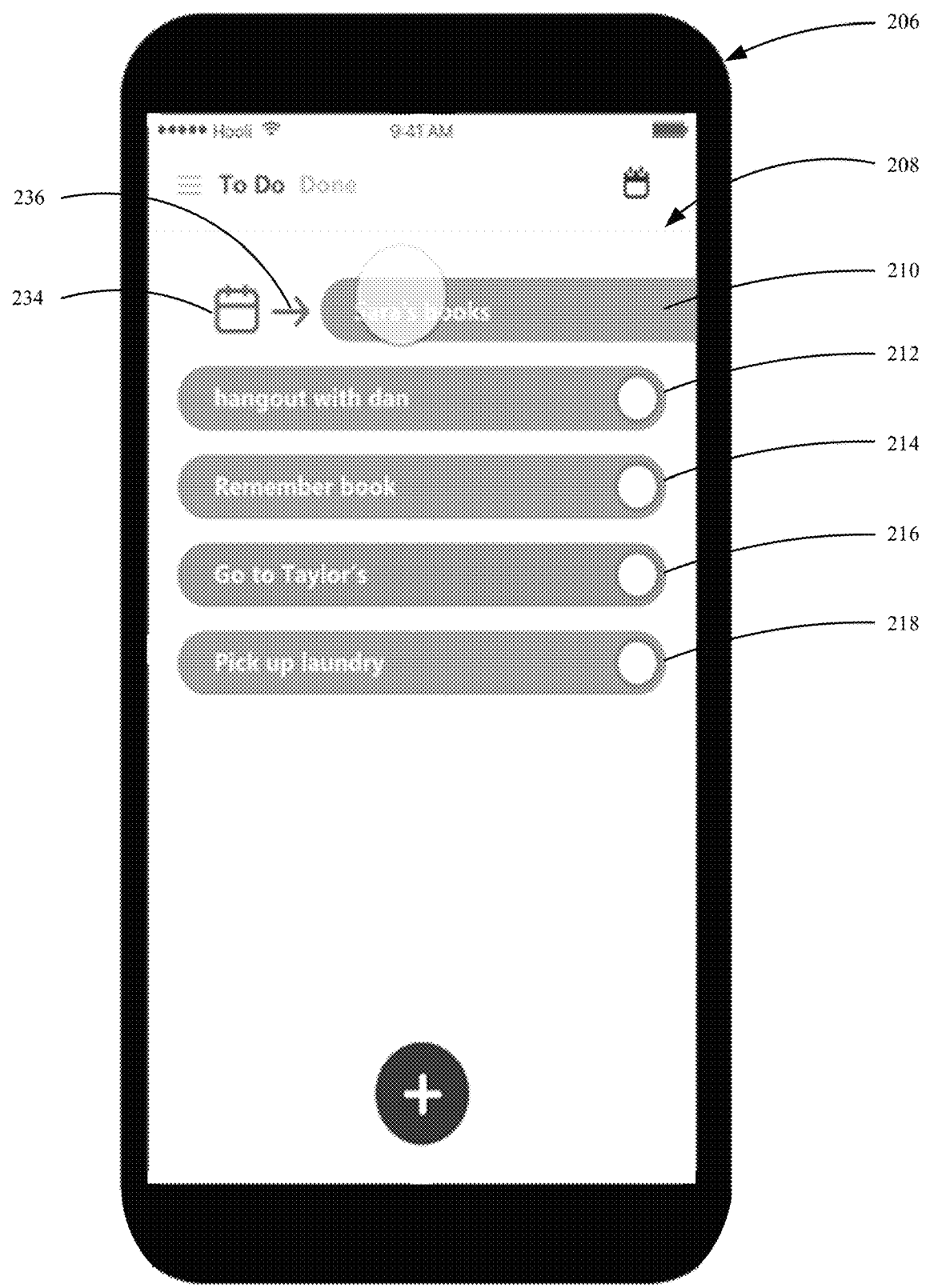

FIG. 3B shows one example of this. Some items in FIG. 3B are similar to those shown in FIG. 3A, and they are similarly numbered. It can be seen in FIG. 3B, however, that the user has touched user actuatable element 210 and moved his or her finger to the right. In one example, flick processing logic 190 then uses control signal generator logic 194 to control user interface logic 116 in order to generate an additional display element 234. Display element 234 indicates that the to-do list entry 210 will be moved to the user's agenda, if the user completes the flick gesture in the direction indicated by arrow 236. If the user completes the flick gesture, then flick processing logic 190 determines that the user wishes to move the to-do list entry corresponding to user actuatable element 210 from the user's to-do list 138 to the user's agenda 146. Determining whether the detected flick gesture corresponds to a command to move the corresponding list entry to the user's agenda is indicated by block 238 in the flow diagram of FIG. 3. If not (e.g., if the user does not complete the flick gesture, or if the flick gesture is in a direction that does not correspond to such a command, or for another reason), then flick processing logic 190 illustratively processes the flick gesture in another way. This is indicated by block 240.

However, if, at block 238, it is determined that the flick gesture does correspond to a command by user 108 to move the corresponding list entry to the user's agenda, then calendar/agenda interaction logic 134 generates control signals to control calendar/agenda management system 114 to indicate that an item is to be moved from the user's to-do list to the user's agenda. In one example, in response, time suggestion logic 172 then accesses the user's calendar or agenda 146. This is indicated by block 242 in the flow diagram of FIG. 2. It then identifies any free times for a current day as indicated by block 244, and it can also identify times or time periods on a subsequent day and a subsequent week that can be surfaced for user selection. This is indicated by block 246.

Time suggestion logic 172 then generates or surfaces a display with a user actuable scheduling element corresponding to each of the free times for the current day, the subsequent day and the subsequent week, that were identified at block 246. This is indicated by block 248 in the flow diagram of FIG. 2.

Figure 3C:
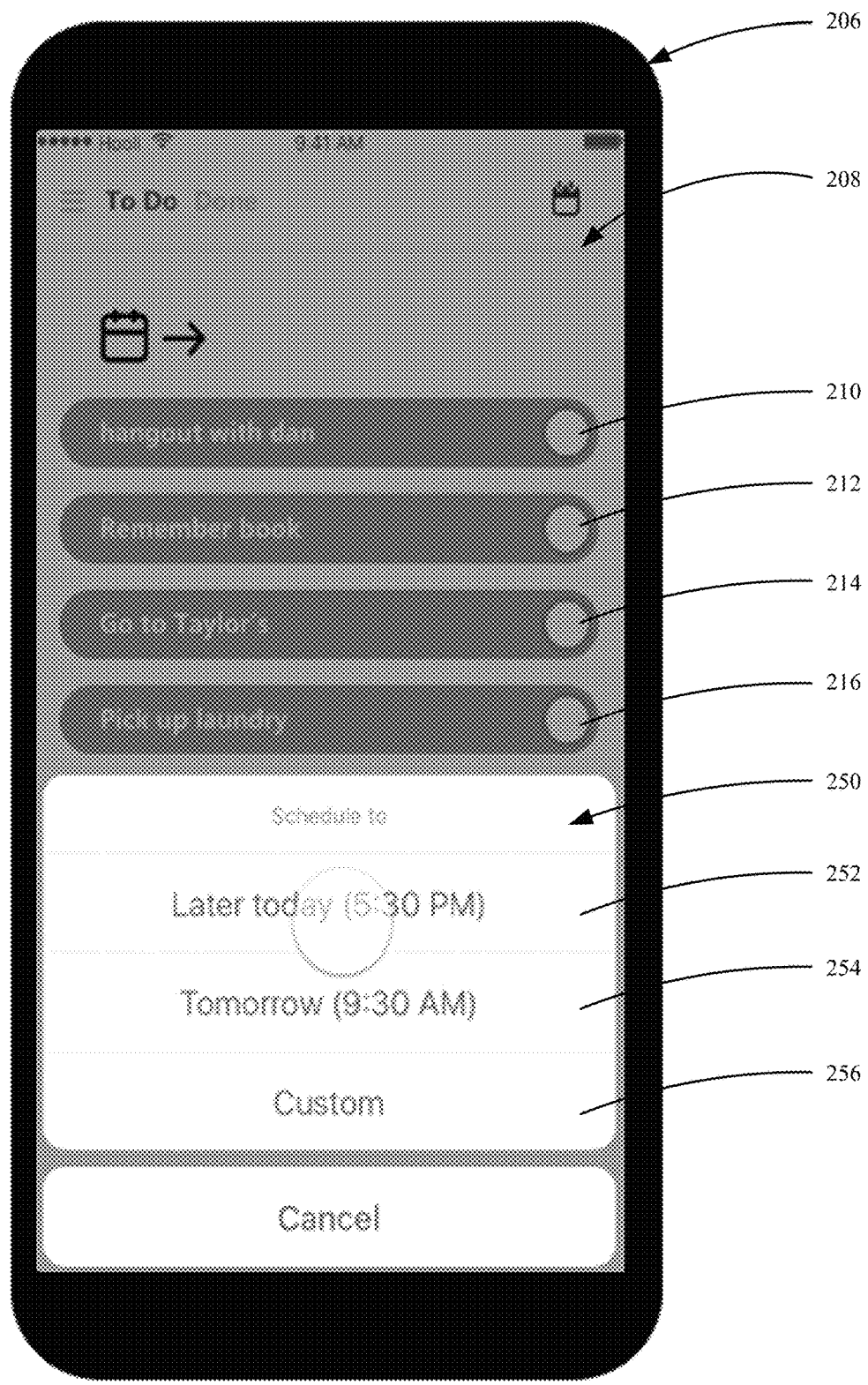

FIG. 3C shows one example of this. FIG. 3C shows that time suggestion logic 172 has surfaced a time suggestion display portion 250. Display portion 250 includes a plurality of user actuatable display elements (e.g., user actuable scheduling elements or other user input mechanisms) 252, 254, and 256. User actuatable display elements 252 and 254 display suggested times where the to-do list entry can be placed on the user's agenda for a current day and a next subsequent day. User actuatable element 256 can be actuated in order to enter a more customized user experience where the user can select a time and date, such as using a time and date picker or using other items. FIG. 3C also shows that, in one example, the user has actuated the user actuatable element 252 to move the to-do list entry to the user's agenda at 5:30 PM on a current day. Detecting user actuation of a user actuatable scheduling element (such as element 252) is indicated by block 258 in the flow diagram of FIG. 2.

Agenda item scheduling logic 168 then generates an agenda item corresponding to the to-do list entry and places it on the user's calendar or agenda, based upon the particular scheduling element that was actuated. For example, it may be that one of the user actuatable scheduling elements corresponds to a subsequent day, a free time on a current day, or a subsequent week. Determining which actuator is actuated is indicated by block 260 in the flow diagram of FIG. 2. If the actuator corresponds to a particular time on a particular day that is free, then agenda item scheduling logic 168 generates a control signal to add the to-do list entry to the user's agenda as an agenda item for a day, at the identified free time. This is indicated by block 262.

If, at block 260, it is determined that the user actuatable scheduling element that was actuated by the user corresponds to a subsequent day (where no particular time is identified) then agenda item scheduling logic 168 generates a control signal to add the to-do list entry to the user's agenda as an agenda item on the identified day (at no particular time). This is indicated by block 264.

If the user actuatable scheduling element that is actuated by the user corresponds to a subsequent week (again, where a specific day and time are not identified) then agenda item scheduling logic 168 generates a control signal to add the to-do list entry to the user's agenda as an agenda item at the identified week (or part of a week, at no particular time). This is indicated by block 266.

Figure 3D:
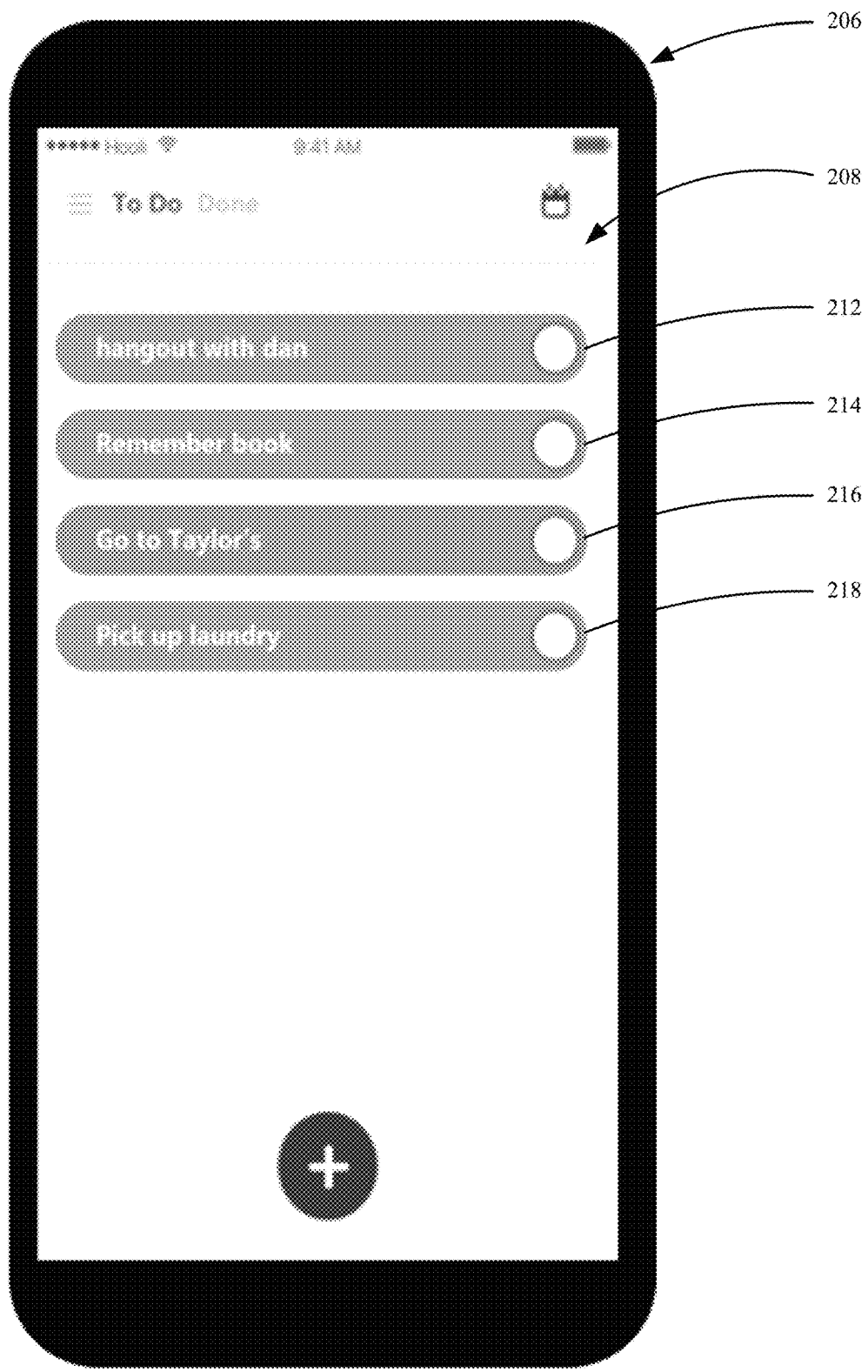

Once the to-do list entry is removed from the user's to-do list and added to the user's agenda, then to-do list management system 112 again displays the user's to-do list, without the list entry that has been moved to the user's agenda. This is indicated by block 268 in the flow diagram of FIG. 2, and FIG. 3D shows one example of this. It can be seen that FIG. 3D is similar to FIG. 3A, except that the to-do list entry represented by actuatable element 210 has now been removed.

Figure 4:
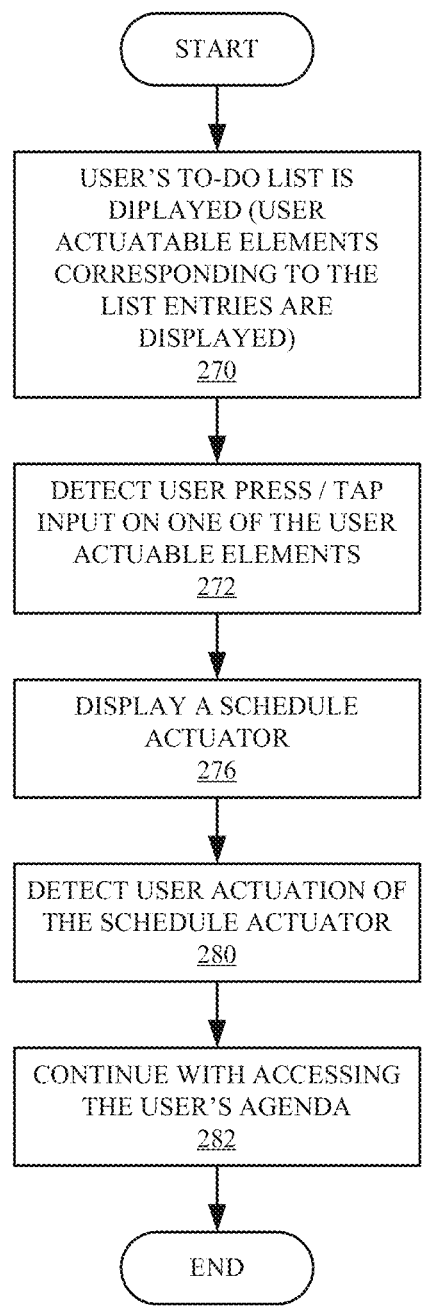
FIG. 4 is a flow diagram illustrating one example of the operation of the architecture illustrated in FIG. 1 in moving a to-do list entry to a user's agenda using a calendar actuator.

FIG. 4 is a flow diagram illustrating one example of the operation of computing system 100 in allowing user 108 to move a to-do list entry from the user's to-do list 138 to the user's agenda 146, using a scheduling actuator, instead of a flick gesture. It is first assumed that the user's to-do list 138 is being displayed by to-do list management system 112 (either by itself, or using display generator logic 122 in user interface logic 116). This is indicated by block 270 in the flow diagram of FIG. 4. FIG. 3A (described above) shows one example of this.

Figure 5A:
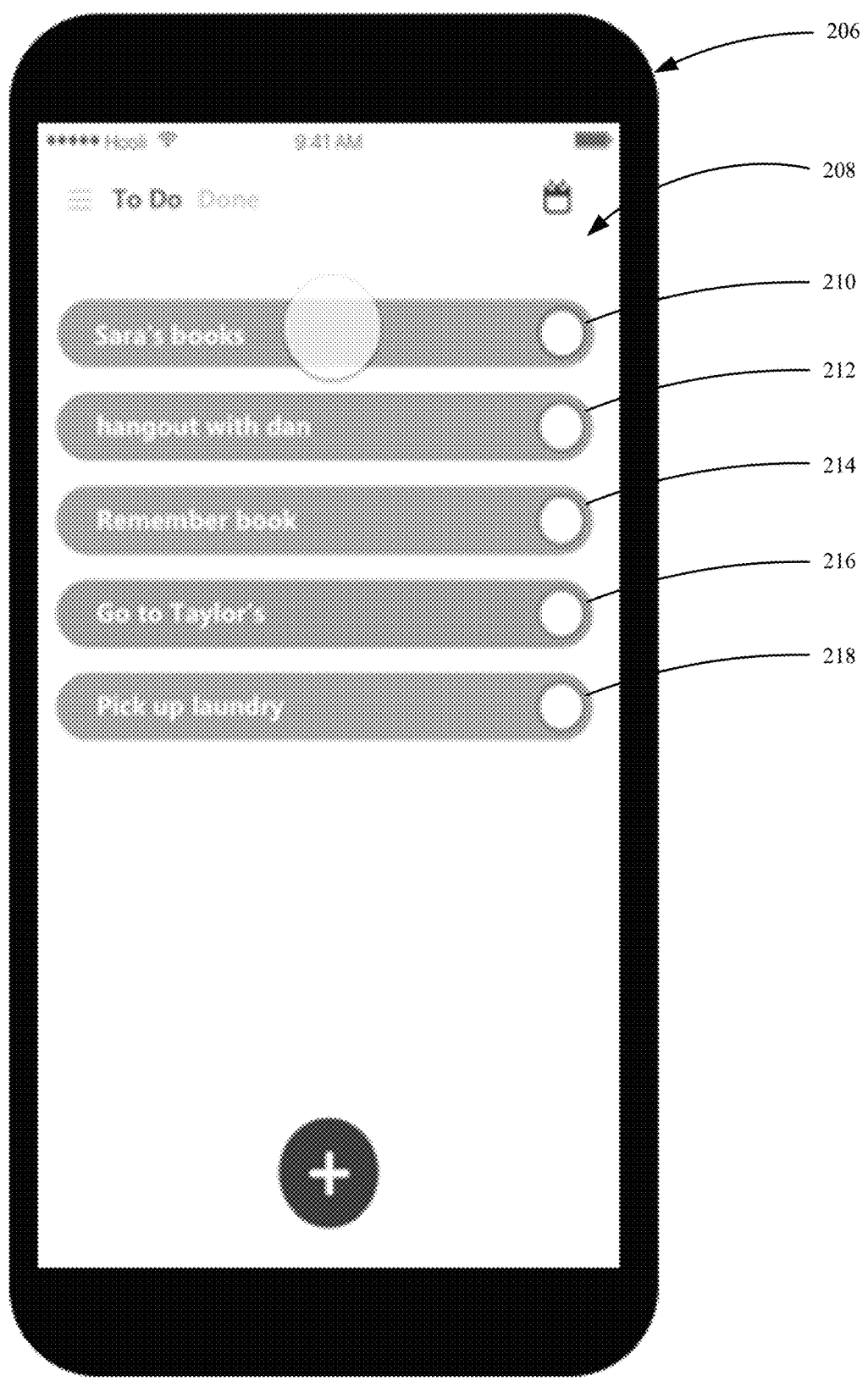
FIGS. 5A-5D show examples of user interface displays.

Interaction detector logic 124 then detects a user press or tap input on one of the user actuatable elements 210-218. This is indicated by block 272 in the flow diagram of FIG. 4. FIG. 5A shows one example of this. Again, some of the items in FIG. 5A are similar to those shown in FIG. 3A, and they are similarly numbered. It can be seen in FIG. 5A, however, that the user has now pressed or tapped on user actuatable display element 210.

Figure 5B:
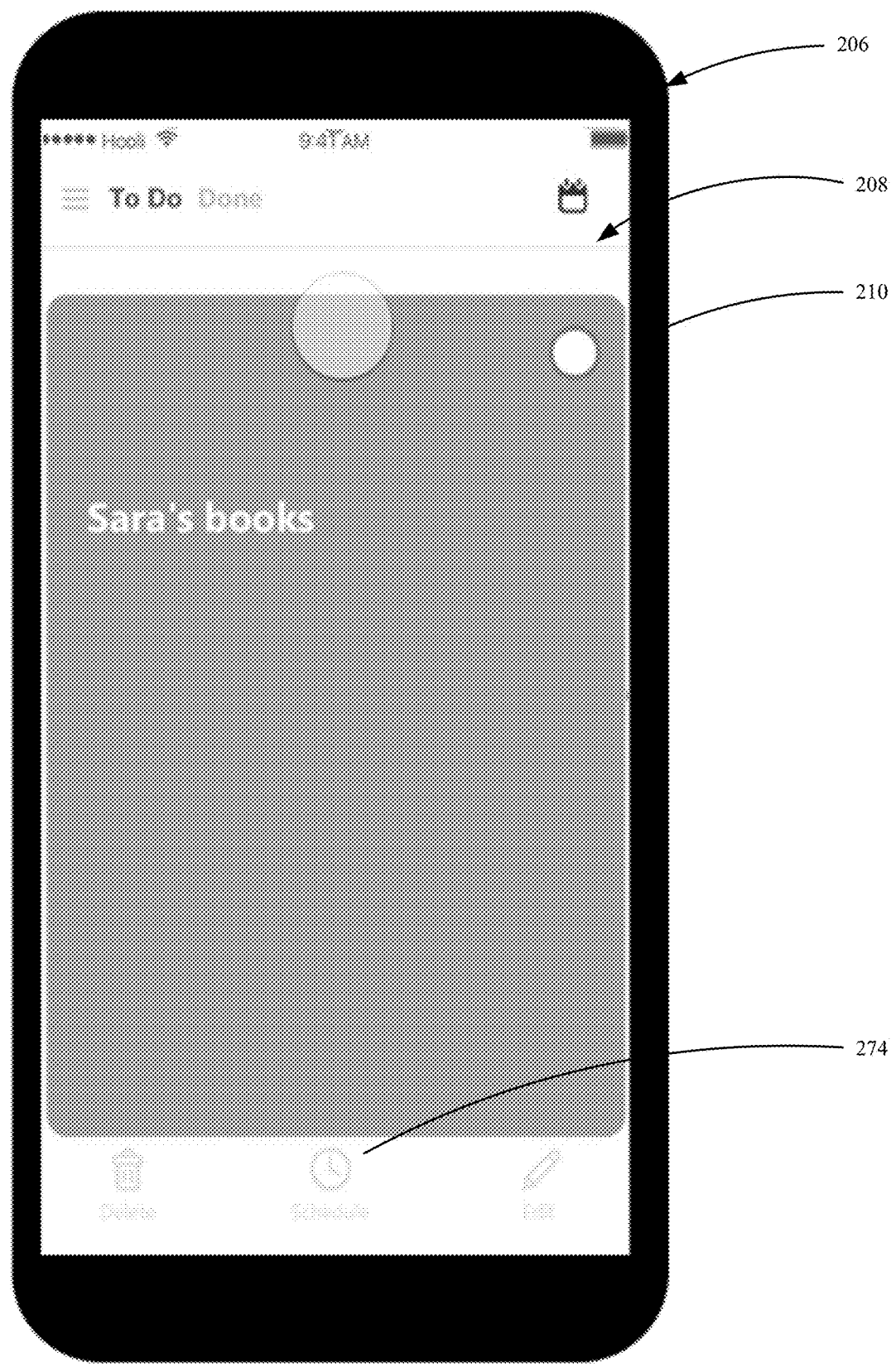
Figure 5C:
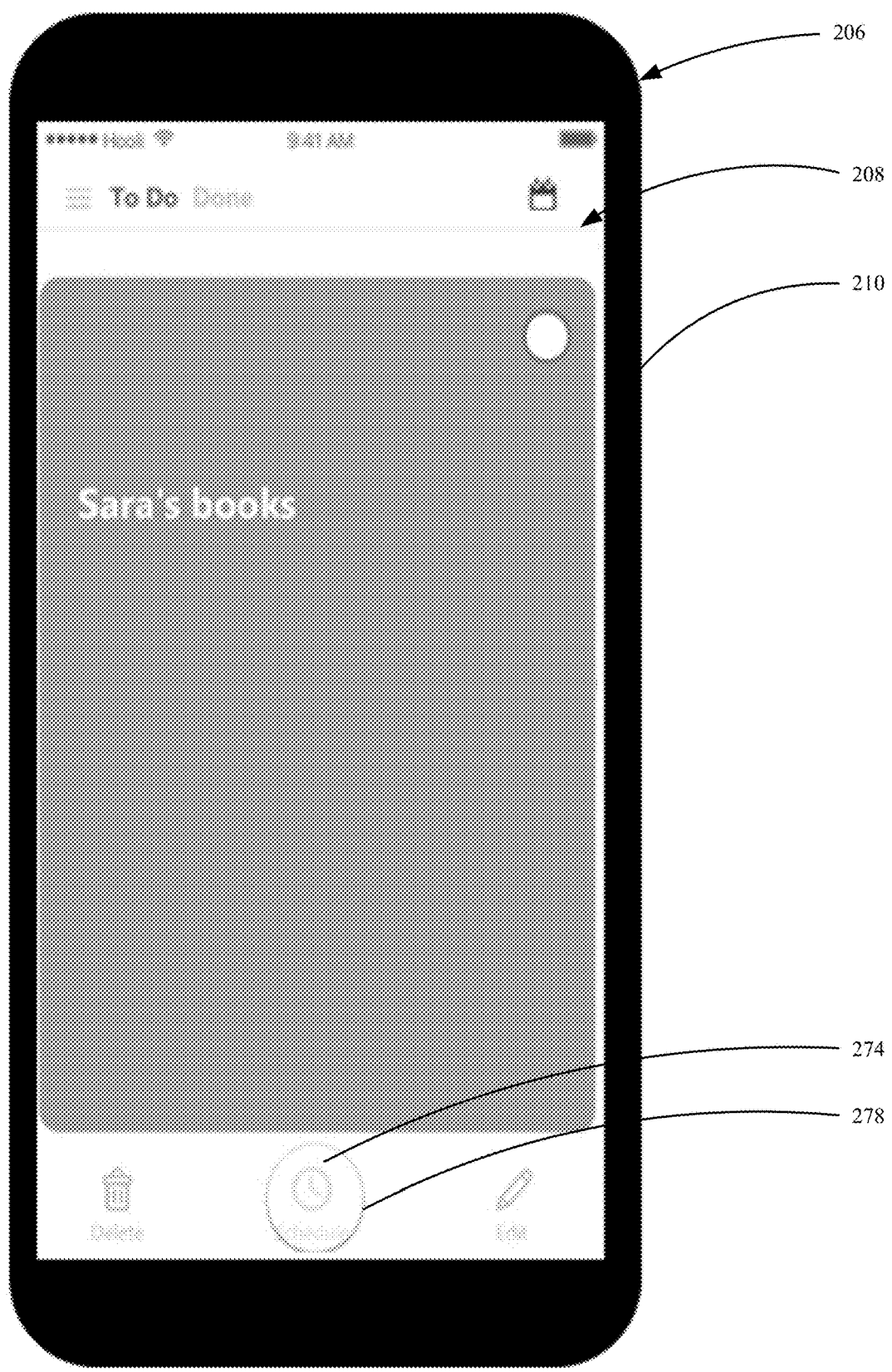

In response, in one example, press/tap processing logic 182 (shown in FIG. 1A) then displays a schedule actuator, such as actuator 274 shown in FIG. 5B. Displaying the schedule actuator is indicated by block 276 in the flow diagram of FIG. 4. FIG. 5C shows that the user has now tapped or otherwise pressed actuator 274. This is generally illustrated at 278. Detecting user actuation of schedule actuator 274 is indicated by block 280 in the flow diagram of FIG. 4. At this point, to-do list management system 112 and calendar/agenda management system 114 (as described above with respect to FIG. 2) illustratively continue with accessing the user's agenda 146 and adding the to-do list entry represented by user actuatable element 210 to the user's agenda. This is indicated by block 282 in the flow diagram of FIG. 4. The processing from this point forward has already generally been described above with respect to blocks 242-268 in the flow diagram of FIG. 2.

Figure 5D:
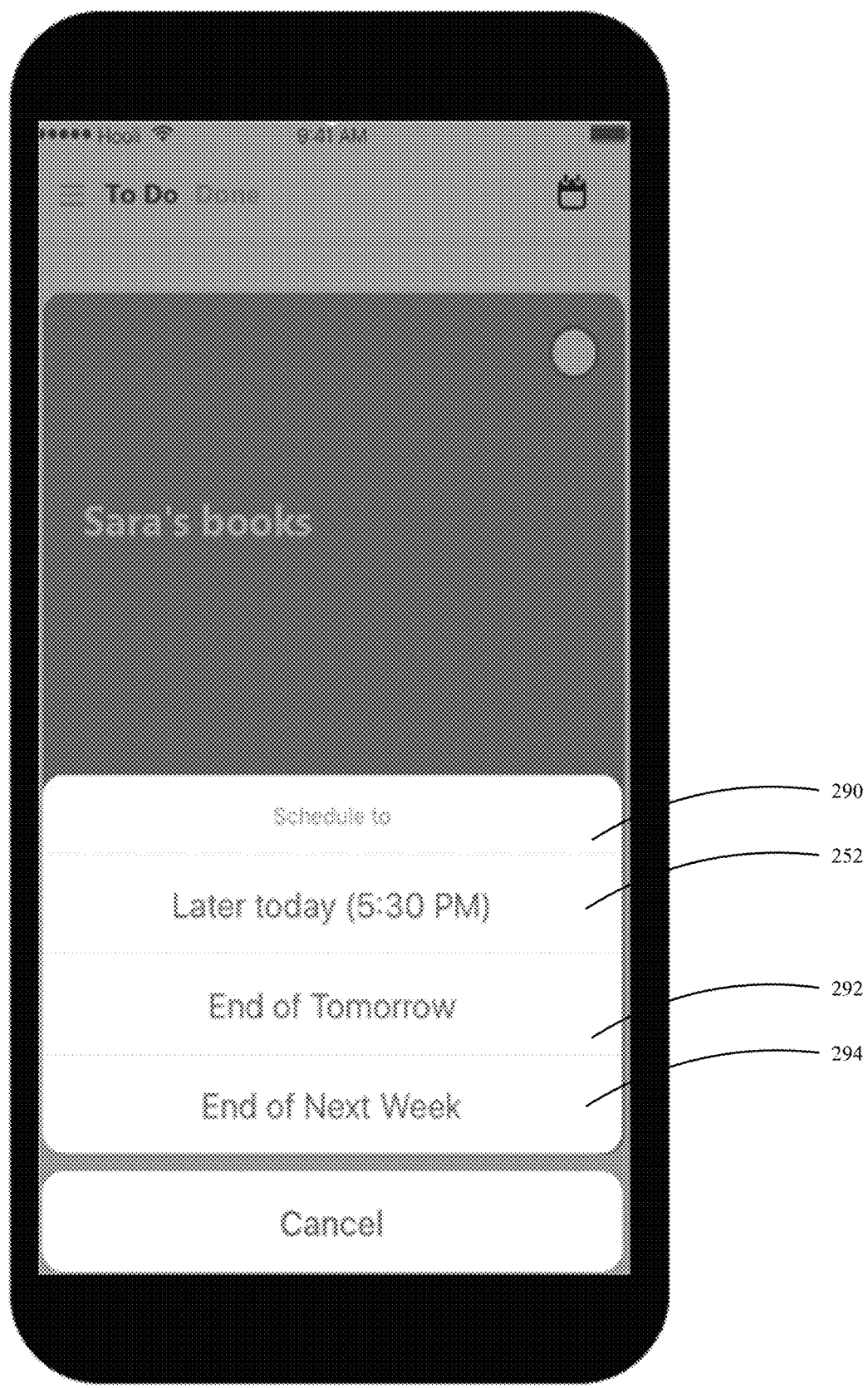

FIG. 5D shows one example of this. Display portion 290 shown in FIG. 5D is similar to display portion 250 shown in FIG. 3C and similar items are similarly numbered. However, in the example shown in FIG. 5D, two of the user actuatable scheduling elements 292 and 294 correspond to particular days, but where no particular time is identified. For instance, actuator 292 corresponds to the "end of tomorrow" on the user's agenda and actuator 294 corresponds to the "end of next week" on the user's agenda. When actuation of one of those actuators is detected, the to-do list entry may be placed on a particular block of time corresponding to the last half of the next subsequent day, or the last half of the next subsequent week, depending on the particular actuator that is actuated.

Again, once the to-do list entry is moved to the agenda, then the to-do list is displayed without that do-do list entry. One example of this is shown and described above with respect to FIG. 3F.

Figure 6A:
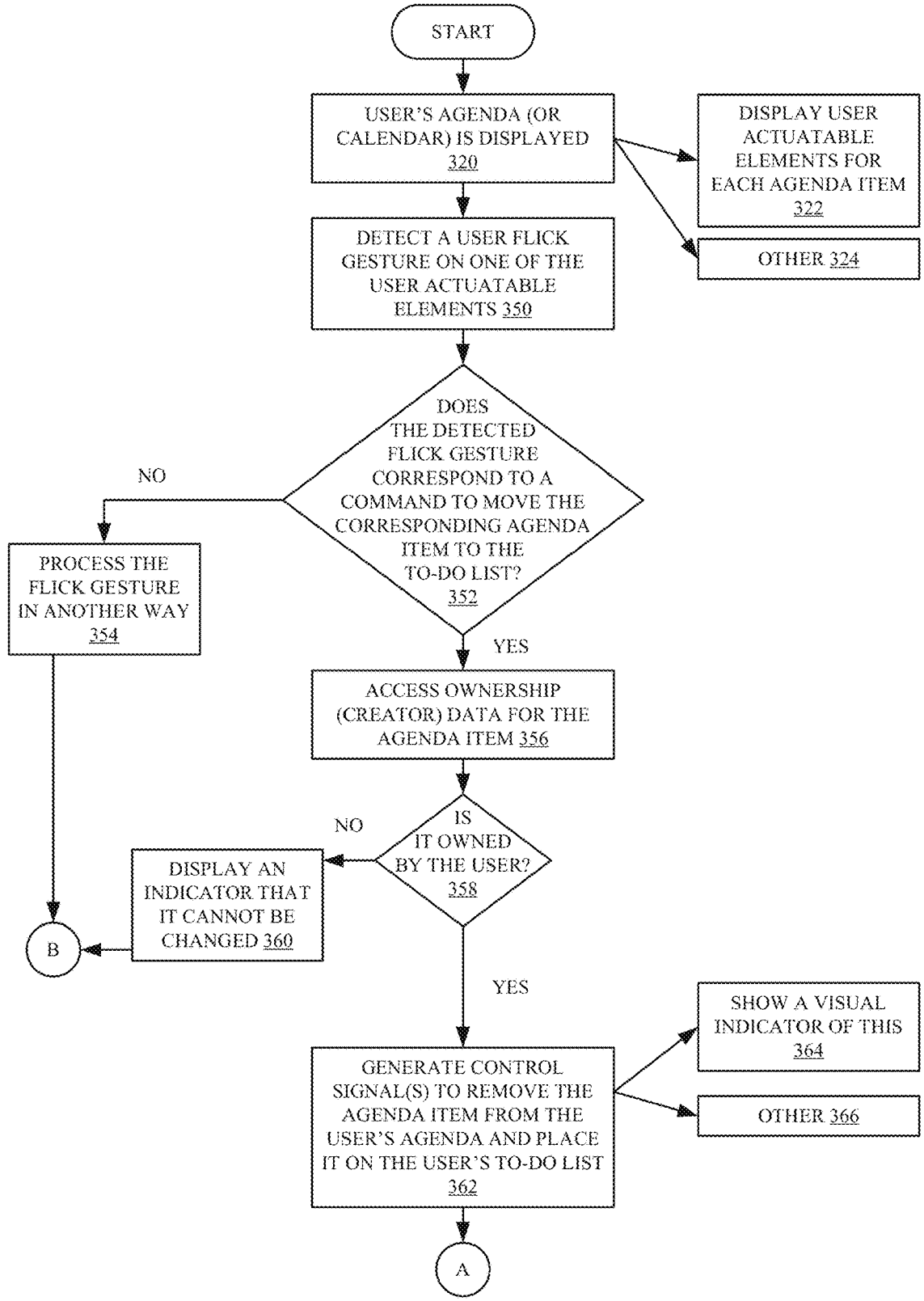
FIGS. 6A and 6B (collectively referred to herein as FIG. 6) illustrate a flow diagram showing one example of the operation of the architecture shown in FIG. 1 in moving an agenda item from a user's agenda to the user's display list.
Figure 6B:
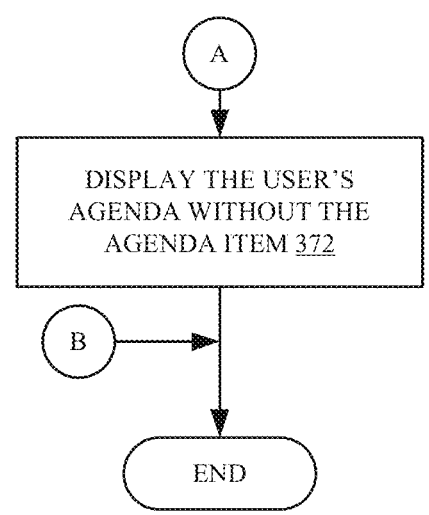

FIGS. 6A and 6B (collectively referred to herein as FIG. 6) show a flow diagram illustrating the operation of computing system 102 in which an item is moved from the user's agenda 146 to the user's to-do list 138. It is first assumed that the user's agenda (or calendar) is currently being displayed.

Figure 7A:
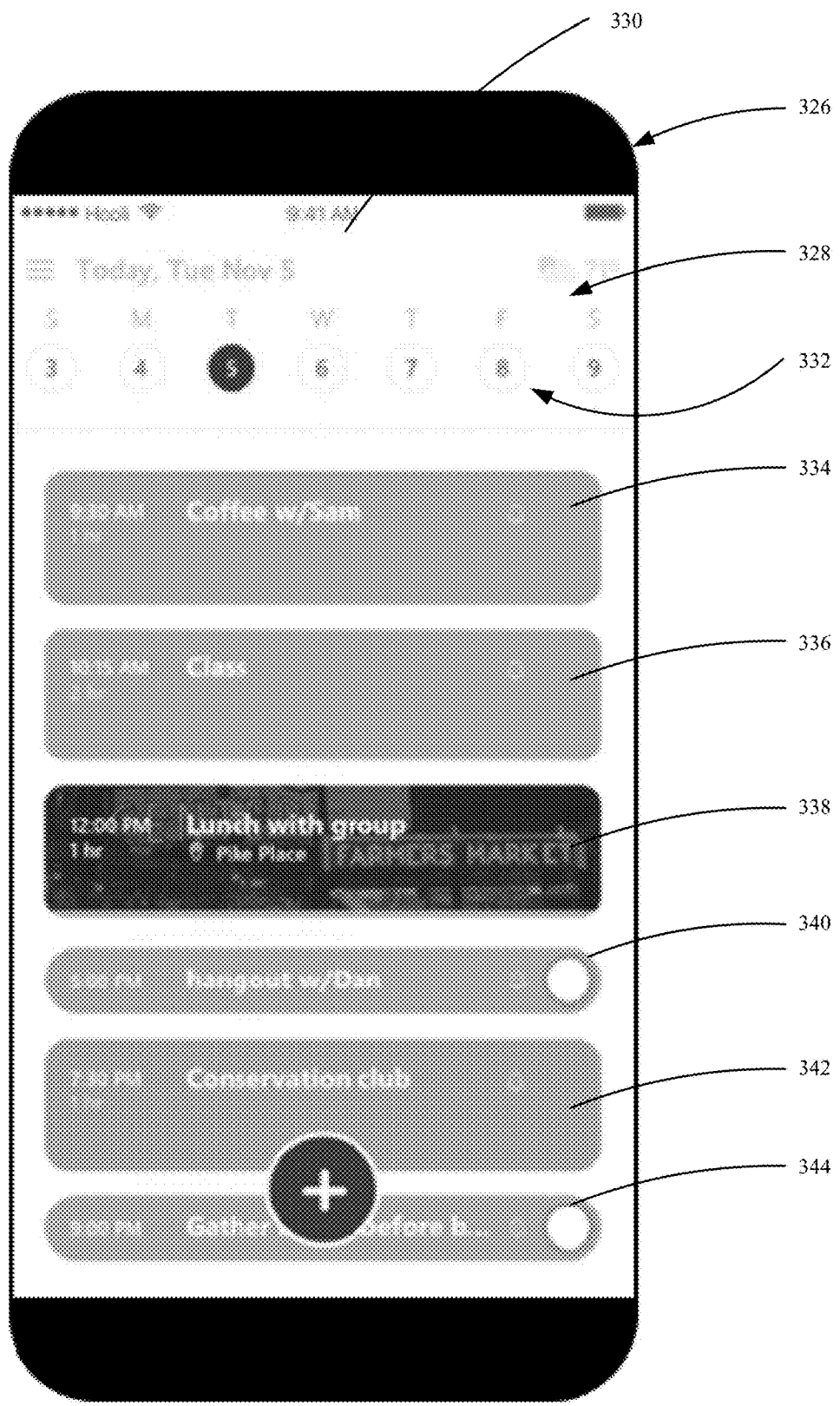
FIGS. 7A-7F show examples of user interface displays.

This is indicated by block 320 in the flow diagram of FIG. 6. In one example, a user actuatable display element can be displayed for each agenda item on the user's agenda. This is indicated by block 322. Other items can be displayed as well, and this is indicated by block 324. FIG. 7A shows one example of this.

It can be seen in FIG. 7A that a mobile device 326 has generated a display shown generally at 328 which includes a date identifier 330 and a day of week identifier 332. For the selected date and day of week, a plurality of user actuatable display elements 334, 336, 338, 340, 342 and 344 are displayed. Each display element 334-344 corresponds to an agenda item on the user's agenda for the selected date and day of week.

Figure 7B:
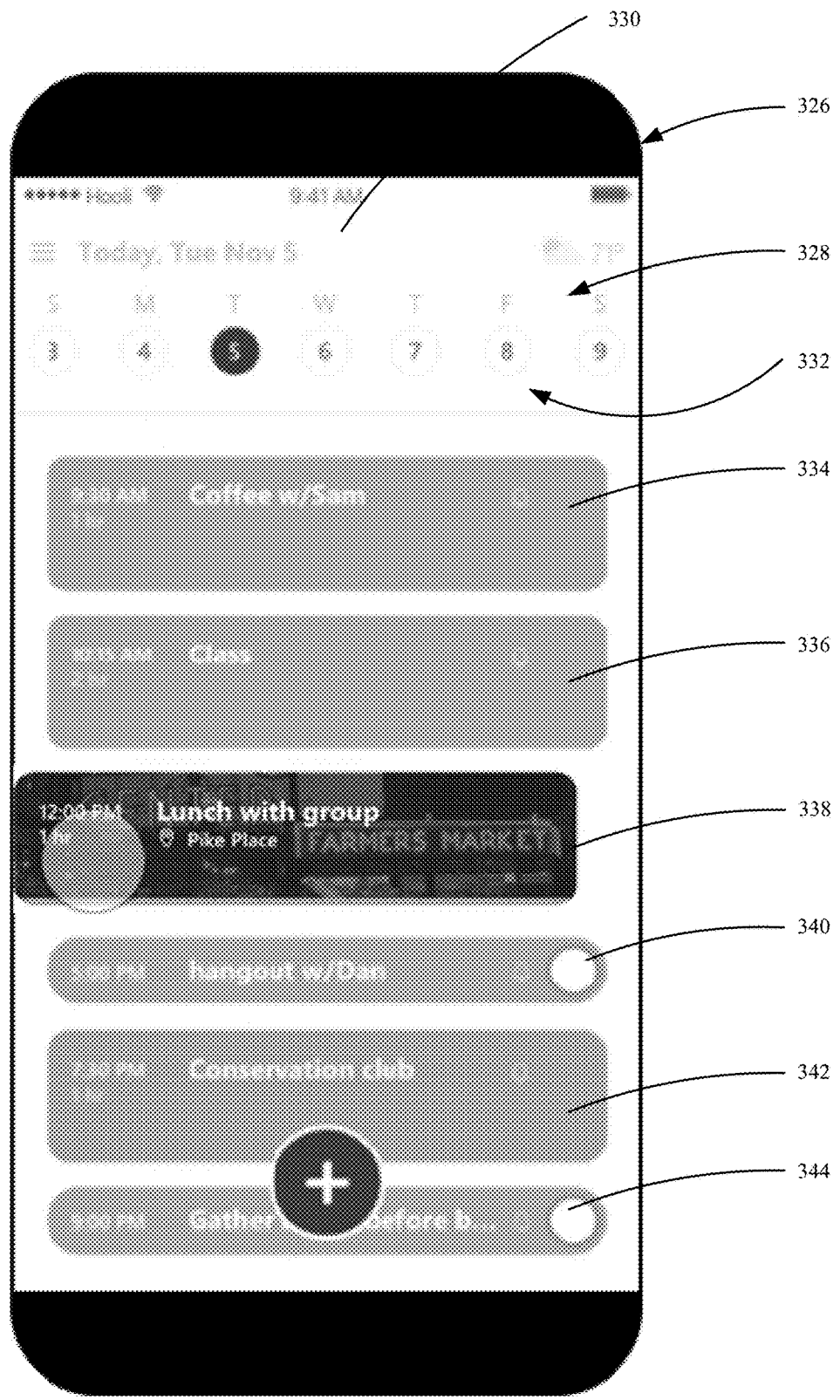

Interaction detector logic 124 then detects that the user has performed a flick gesture with respect to one of the user actuatable elements 334-344. FIG. 7B shows one example of this. FIG. 7B is similar to FIG. 7A and similar items are similarly numbered. However, it can be seen in FIG. 7B that the user has now touched user actuatable element 338 and moved it to the left with a flick or sliding gesture. Detecting the user flick or sliding gesture on one of the user actuatable elements 334-344 is indicated by block 350 in the flow diagram of FIG. 6.

Flick processing logic 190 then determines whether the flick gesture corresponds to a command to move the corresponding agenda item to the user's to-do list. This is indicated by block 352. This can be determined, for instance, based on the direction of the flick gesture or in other ways. If it does not correspond to a command to move the corresponding agenda item to the user's to-do list, then flick processing logic 190 processes the flick gesture in any of a variety of other ways. This is indicated by block 354 in the flow diagram of FIG. 6.

However, if, at block 352, it is determined that the flick gesture does correspond to a command to move the corresponding agenda item to the user's to-do list, then ownership (or creator) identifier logic 192 identifies the ownership (or creator) of the corresponding agenda item. This can be done by accessing the ownership indicator on the agenda item as illustrated on agenda 146 in FIG. 1. Accessing the ownership or creator indicator for the agenda item is indicated by block 356 in the flow diagram of FIG. 6.

Figure 7C:
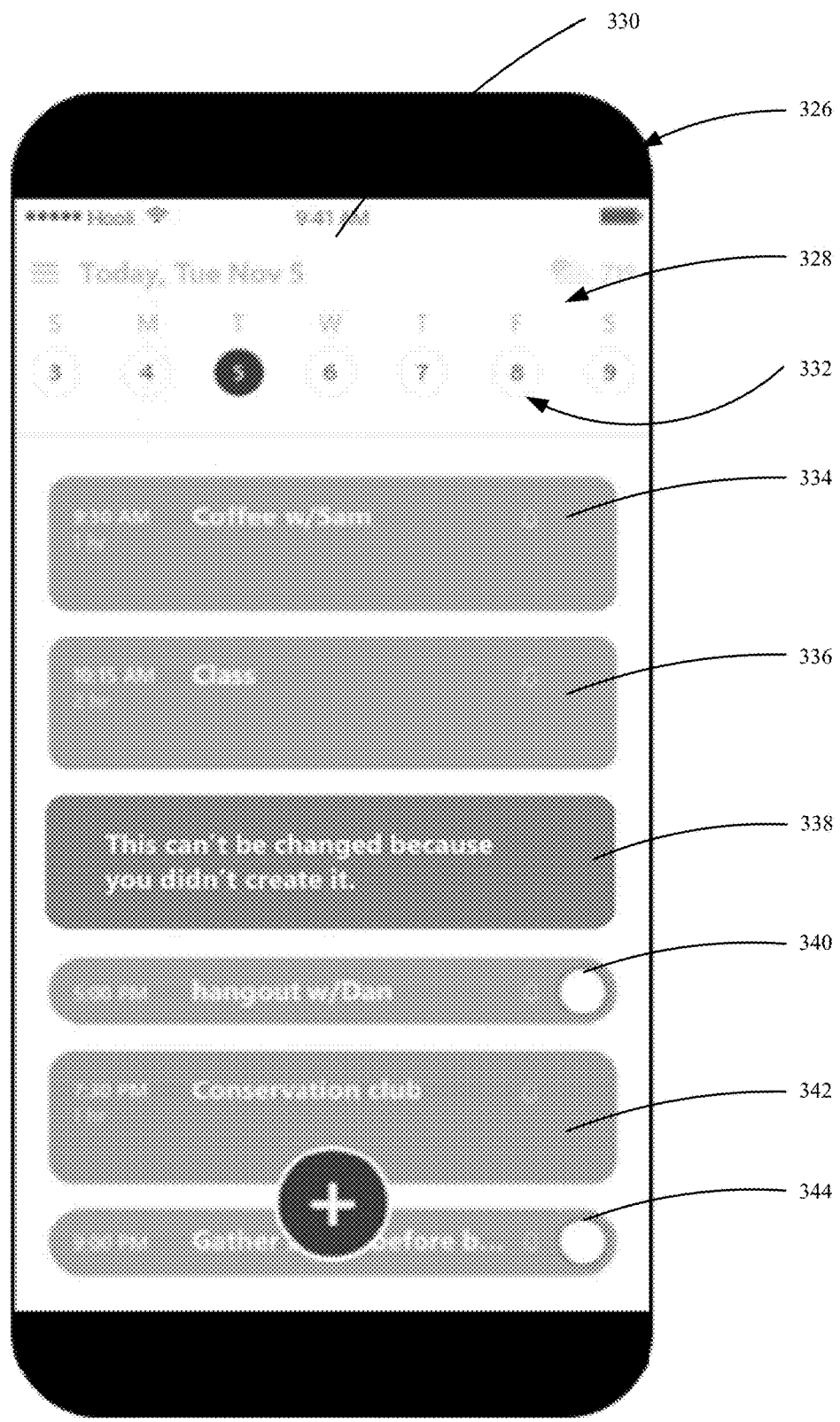

If the agenda item is not owned by the current user, as indicated by block 358, then flick processing logic 190 controls display generator logic 122 to display some type of indicator that the agenda item cannot be changed, because the user is not the owner. This is indicated by block 360, and FIG. 7C shows one example of this. It can be seen in FIG. 7C that user actuatable element 338 had been temporarily changed so that a textual message is displayed on it. In the example shown in FIG. 7C, the textual message reads "This can't be changed because you didn't create it." Of course, this is only one example of an indicator that indicates the underlying agenda item cannot be changed by the user, because the user did not own it, did not create it, or for another reason.

Figure 7D:
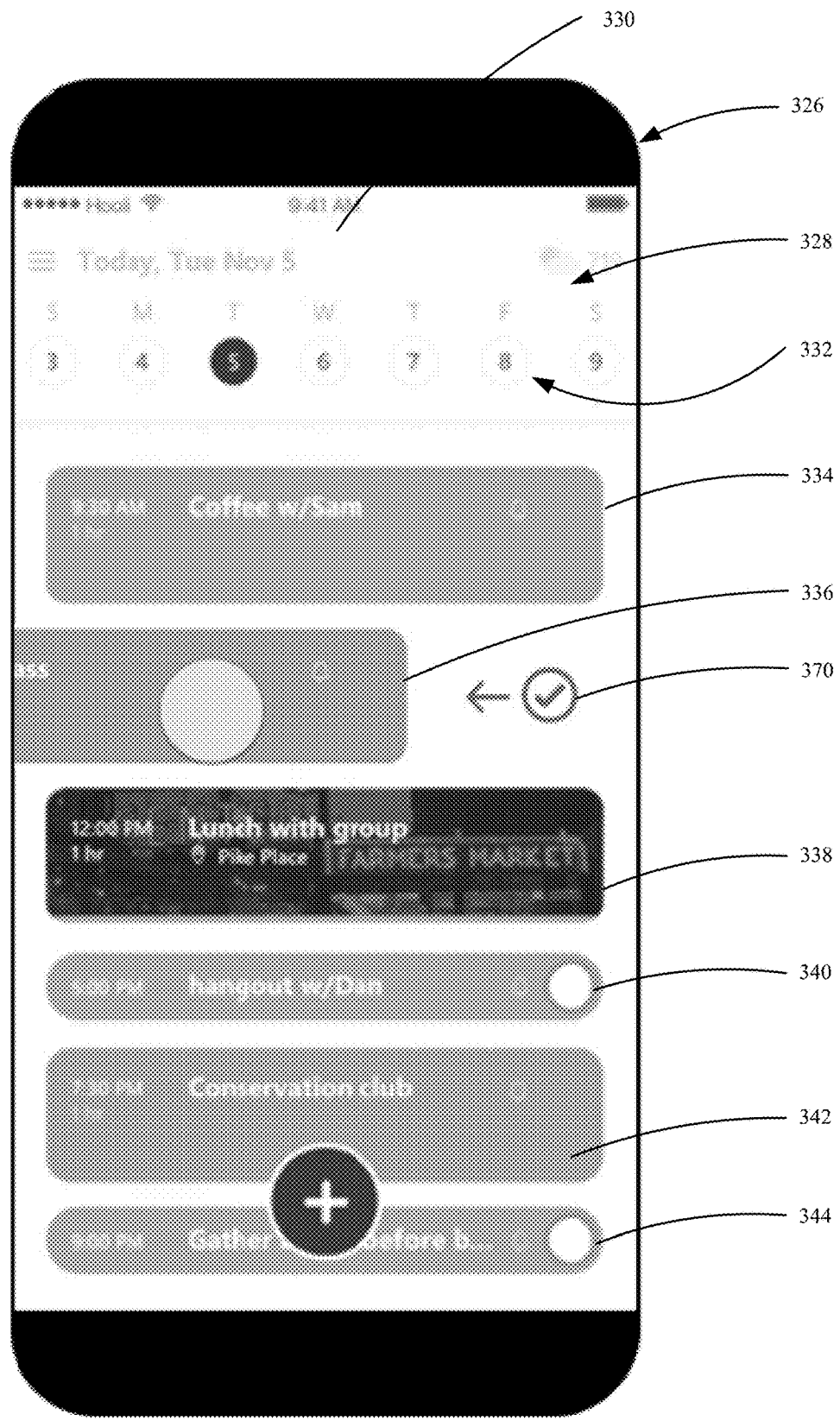

If, however, ownership (creator) identifier logic 192 determines that the current user does own (or did create) the underlying agenda item, then flick processing logic 190 determines that the underlying agenda item is to be moved to the user's to-do list and uses control signal generator logic 194 to generate control signals that interact with agenda item removal logic 120 and either calendar/agenda interaction logic 134 or list entry addition logic 128 (both shown in FIG. 1) to add the agenda item to the user's to-do list 138, and to remove it from the user's agenda 146. This is indicated by block 362 in the flow diagram of FIG. 6. In doing so, it can also show a visual indicator indicating that the agenda item will be moved to the user's to-do list. This is indicated by block 364. It can perform other operations in doing this as well, and this is indicated by block 366. FIG. 7D shows one example of this.

FIG. 7D is similar to FIG. 7A, and similar items are similarly numbered. However, it can be seen in FIG. 7D that the user has now performed a flick gesture with respect to user actuatable element 336. In response, flick processing logic 190 can control display generator logic 122 to display an indicator that indicates that the underlying agenda item represented by user actuatable element 336 will be removed from the user's agenda 146 and placed on the user's to-do list 138.

Figure 7E:
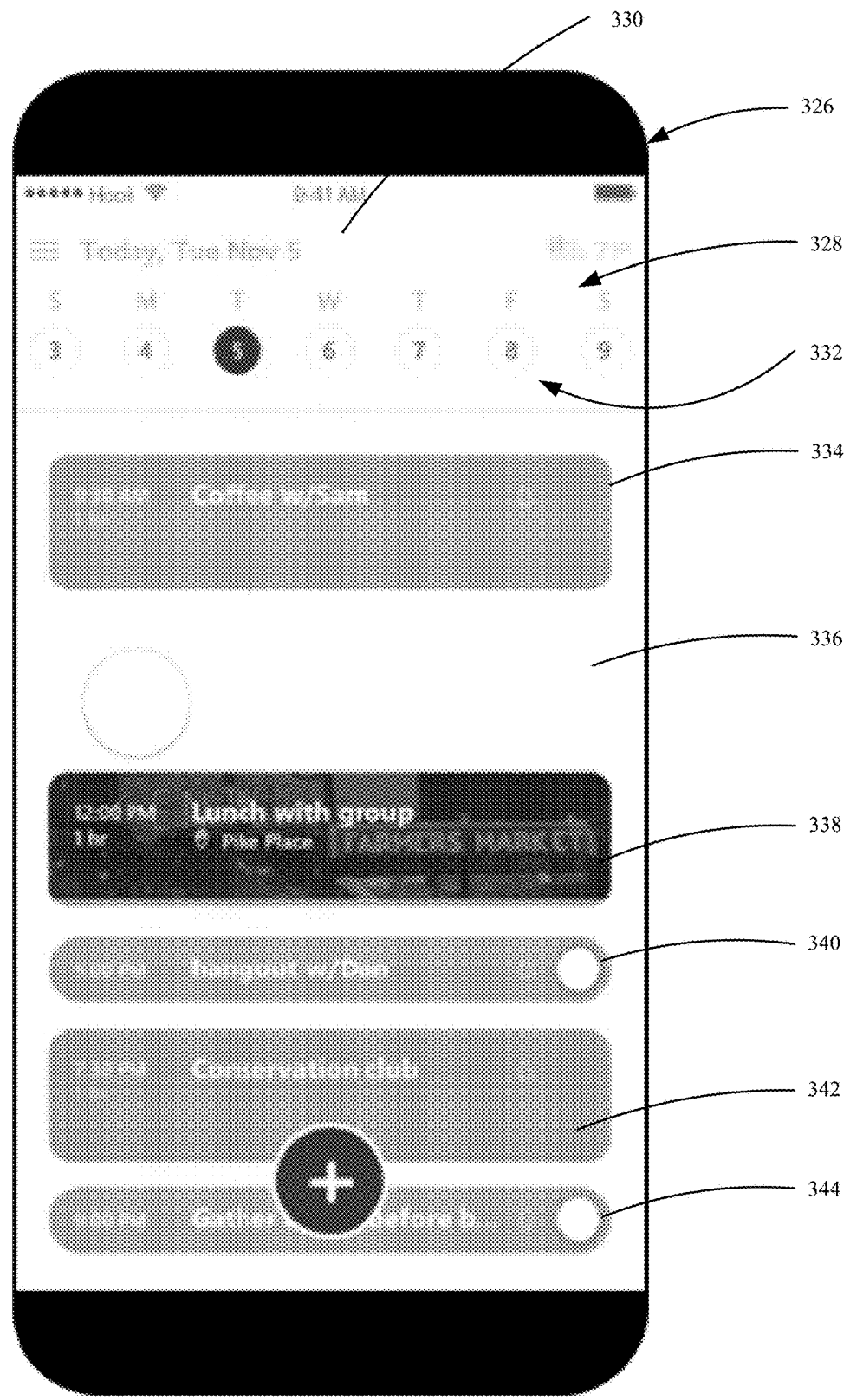
Figure 7F:
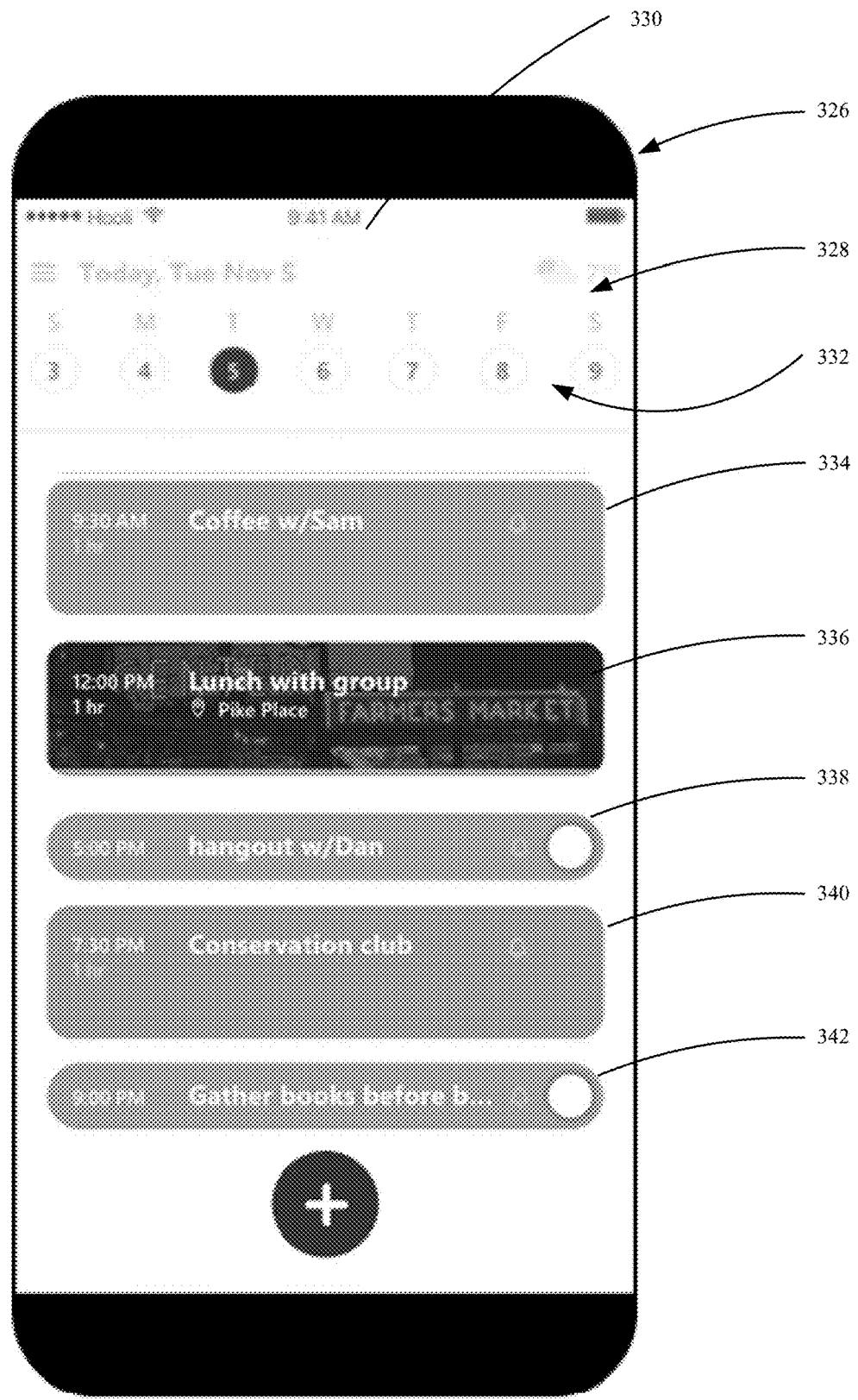

Flick processing logic 190 can also control display generator logic 122 to display the user's agenda, without the agenda item that was just moved to the user's to-do list. This is indicated by block 372 in the flow diagram of FIG. 6. FIGS. 7E and 7F show one example of this. FIG. 7E is similar to FIG. 7D, and similar items are similarly numbered. However, it can now be seen that the user's agenda is displayed without the agenda item corresponding to user actuatable element 336, because that agenda item has been moved to the user's to-do list. Similarly, FIG. 7F shows the user's agenda, where the remaining user actuatable elements 334, 338, 340, 342, and 344 have now been repositioned more closely proximate one another.

It can thus be seen that the present description provides a discussion in which user input gestures on the user's to-do list and on the user's calendar can be detected to quickly and easily transfer items between the user's to-do list and the user's agenda. This enhances the operation of the computing system itself, in that the user need not continuously navigate between those two systems in order to move one item from one to the other. Because the user need not provide as many user input steps, the processing overhead and memory needed for processing those user inputs is reduced. Similarly, this greatly enhances the user experience. It can be cumbersome and time consuming to move things between the user's agenda and to-do list. By doing so in response to relatively quick and easy user input gestures, the user's experience is greatly enhanced when performing these operations.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
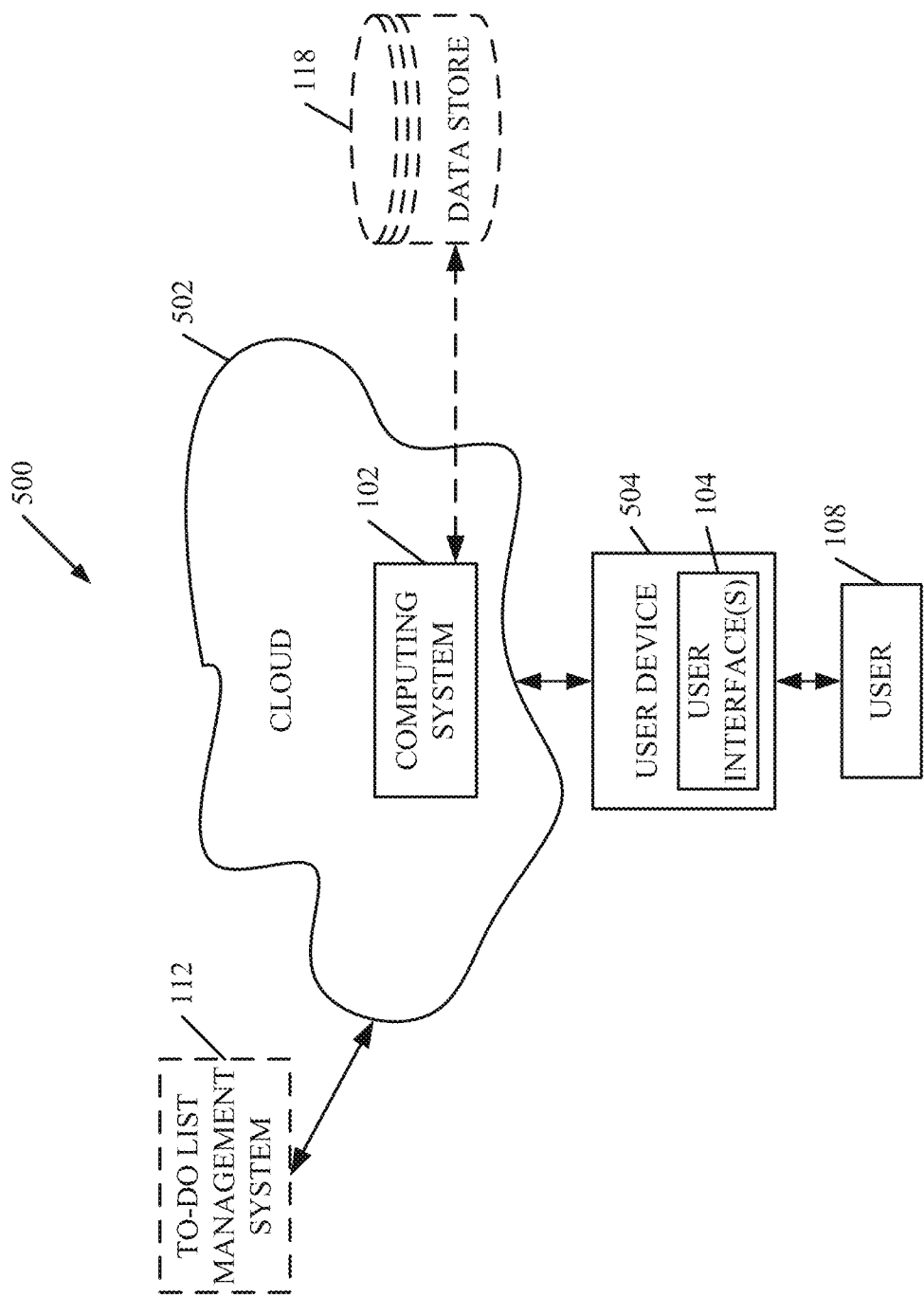
FIG. 8 shows one example of the architecture illustrated in FIG. 1, deployed in a cloud computing architecture.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that computing system 102 can be located in cloud 502 (which can be public, private, or a combination where portions are public while others are private). Therefore, user 108 uses a user device 504 that includes a client computing system to access computing system 102 through cloud 502.

FIG. 8 also depicts another example of a cloud architecture. FIG. 8 shows that it is also contemplated that some elements of computing system 102 can be disposed in cloud 502 while others are not. By way of example, data store 118 can be disposed outside of cloud 502, and accessed through cloud 502. In another example, to-do list management system 112, or other items of architecture 100, can be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
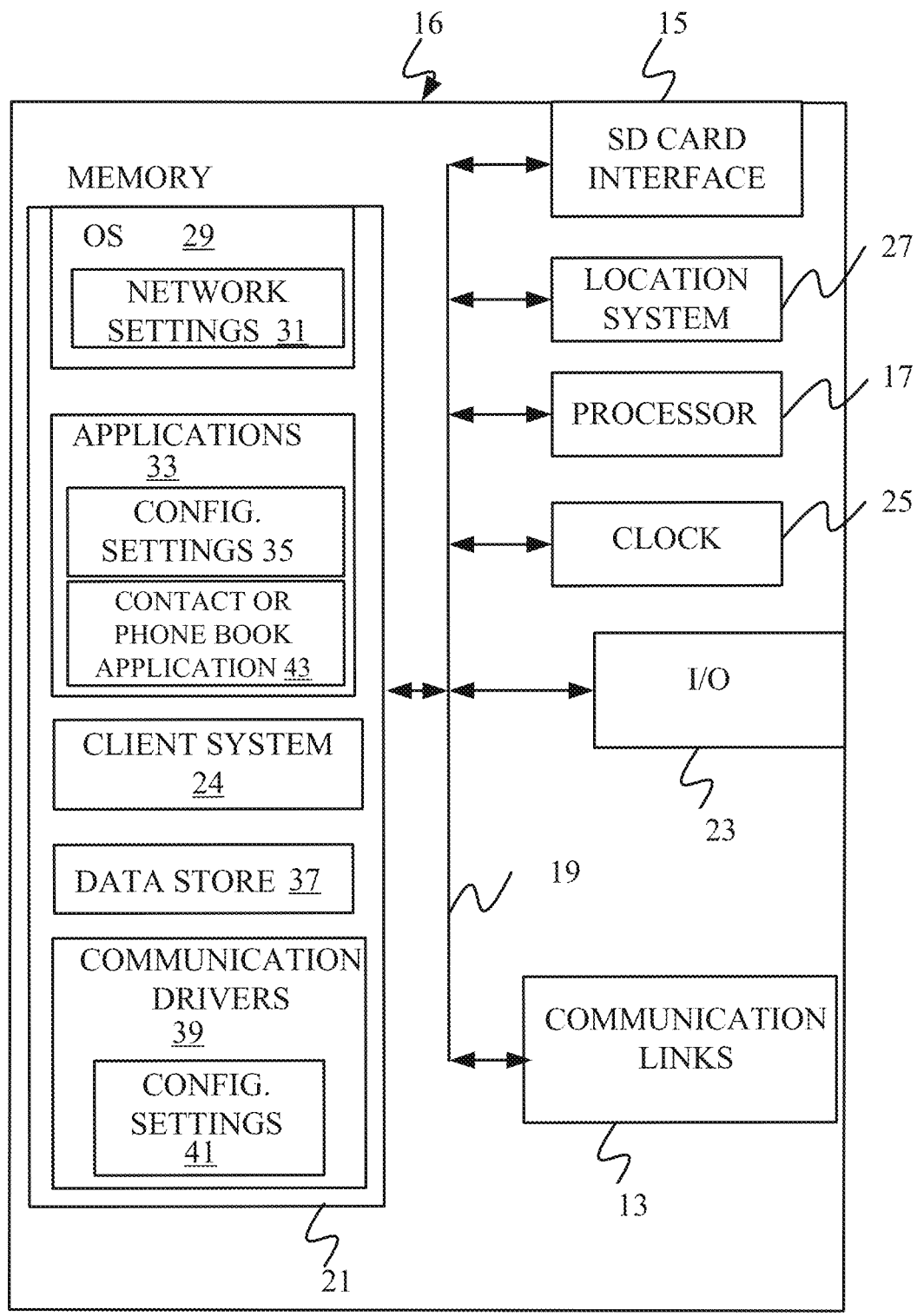
FIGS. 9-11 show examples of mobile devices that can be used in the architectures illustrated in the previous figures.
Figure 10:
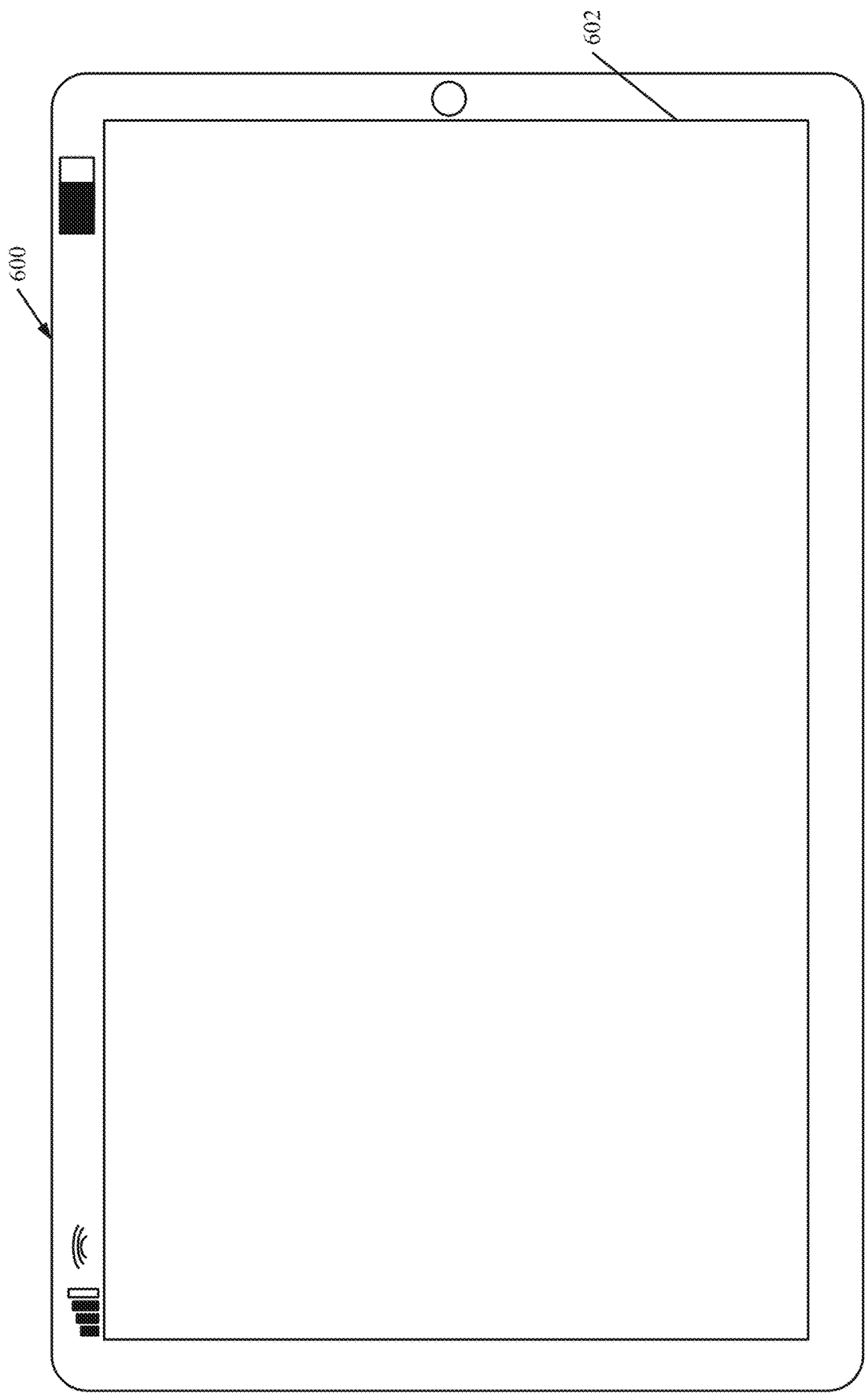
Figure 11:
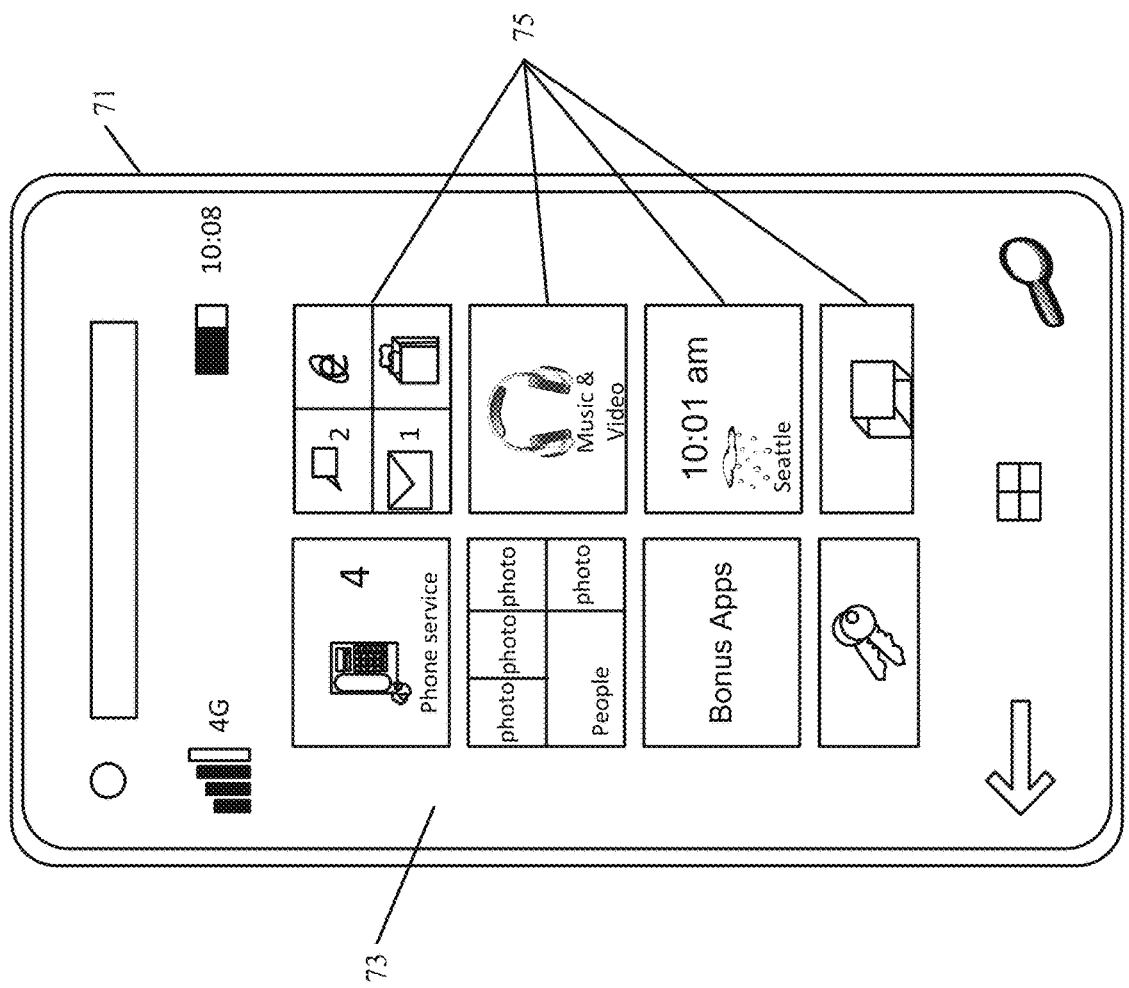

FIG. 9 is a simplified block diagram of one illustrative example of a handheld or mobile computing device that can be used as a user's or client's hand held device 16, in which the present system (or parts of it) can be deployed. FIGS. 10-11 are examples of handheld or mobile devices.

FIG. 9 provides a general block diagram of the components of a client device 16 that can run components of architecture 100 or 500 that interacts with architectures 100 or 500, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 110 or those on other devices in architectures 100 or 500) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 10 shows one example in which device 16 is a tablet computer 600. In FIG. 10, computer 600 is shown with user interface display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
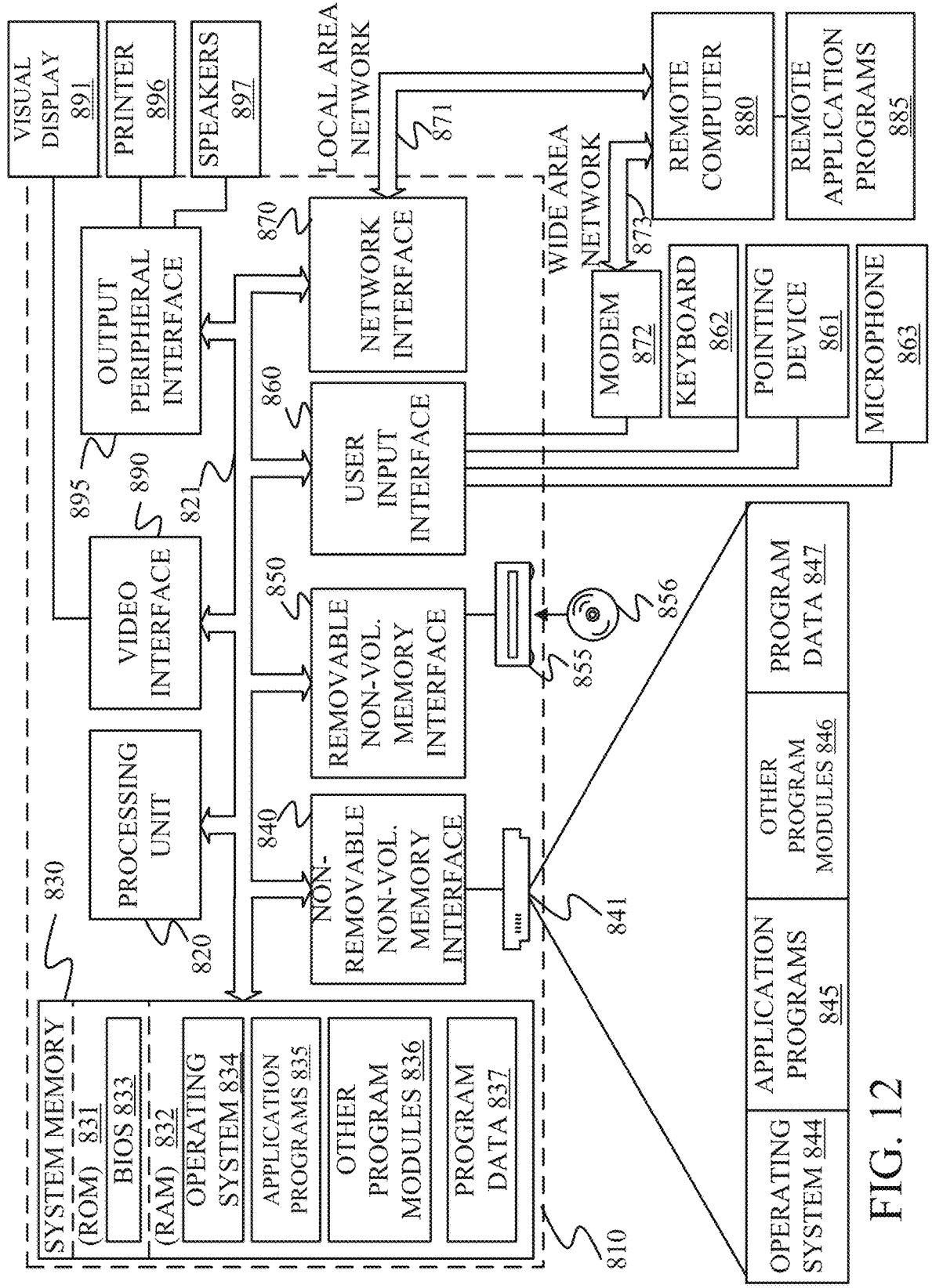
FIG. 12 is a block diagram showing one example of a computing environment that can be used in the architectures shown in the previous figures.

FIG. 12 is one example of a computing environment in which architecture 100, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers 110 or those in other devices in architectures 100 or 500), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a to-do list management system that generates a to-do list user interface with a user actuatable list element corresponding to each entry on a user's to-do list;

an agenda management system configured to generate a user's agenda for the user, with agenda items assigned to time periods; and agenda interaction logic that detects a user flick gesture on a given user actuatable list element on the to-do list interface corresponding to a given entry on the user's to-do list, and in response to the detected flick gesture, generates a control signal to control the agenda management system to add an agenda item to the user's agenda, for the given entry on the user's to-do list corresponding to the given user actuatable list element.

Example 2 is the computing system of any or all previous examples wherein the agenda management system is configured to surface the user's agenda with an agenda interface that has a user actuatable agenda element corresponding to each agenda item on the agenda interface.

Example 3 is the computing system of any or all previous examples wherein the agenda management system comprises:

to-do list interaction logic configured to detect a user flick gesture on a given user actuatable agenda element on the agenda interface corresponding to a given agenda item, and in response to the detected flick gesture on the agenda interface, generate a control signal to control the to-do list management system to add an entry on the user's to-do list, for the given agenda item on the user's agenda.

Example 4 is the computing system of any or all previous examples wherein the to-do list management system comprises:

list entry deletion logic configured to remove the given entry from the user's to-do list and generate an updated to-do list user interface without the given user actuatable list element corresponding to the given entry.

Example 5 is the computing system of any or all previous examples wherein the agenda management system comprises:

agenda item removal logic configured to remove the given agenda item from the user's agenda and generate an updated agenda interface without the given user actuatable agenda element corresponding to the given agenda item.

Example 6 is the computing system of any or all previous examples wherein the agenda management system comprises:

agenda item ownership logic configured to identify a creator of each agenda item and generate an ownership indicator corresponding to each agenda item indicative of the identified creator of the corresponding agenda item.

Example 7 is the computing system of any or all previous examples wherein the to-do list interaction logic comprises:

ownership identifier logic configured to identify a creator of the given agenda item in response to detection of the flick gesture on the given user actuatable agenda element and to determine whether the creator of the given agenda item is the user, the to-do list interaction logic processing the flick gesture detected on the given user actuatable agenda element based on the determination.

Example 8 is the computing system of any or all previous examples wherein the to-do list interaction logic controls the agenda item removal logic to inhibit removal of the given agenda item from the user's agenda in response to the ownership identifier logic determining that the creator of the given agenda item is not the user.

Example 9 is the computing system of any or all previous examples wherein the agenda management system comprises:

time suggestion logic that identifies a suggested time for adding the agenda item to the user's agenda for the given entry on the user's to-do list.

Example 10 is the computing system of any or all previous examples wherein the agenda interaction logic surfaces a user actuatable time selection element for each suggested time and detects user actuation of a given time selection element to select a time for the agenda item.

Example 11 is a computing system, comprising:

a to-do list management system configured to generate a user's to-do list on a to-do list user interface with a list entry corresponding to each entry on a user's to-do list;

an agenda management system configured to generate a user's agenda for the user on an agenda interface, with a user actuatable agenda element corresponding to each agenda item on the user's agenda; and to-do list interaction logic configured to detect a user flick gesture on a given user actuatable agenda element on the agenda interface corresponding to a given agenda item, and in response to the detected flick gesture on the agenda interface, generate a control signal to control the to-do list management system to add an entry on the user's to-do list, for the given agenda item on the user's agenda.

Example 12 is the computing system of any or all previous examples wherein the to-do list management system is configured to surface the user's to-do list with the to-do list interface with a user actuatable list element corresponding to each list entry on the to-do list interface.

Example 13 is the computing system of any or all previous examples wherein the to-do list management system comprises:

agenda interaction logic that detects a user flick gesture on a given user actuatable list element on the to-do list interface corresponding to a given entry on the user's to-do list, and in response to the detected flick gesture, generates a control signal to control the agenda management system to add an agenda item to the user's agenda, for the given entry on the user's to-do list corresponding to the given user actuatable list element.

Example 14 is the computing system of any or all previous examples wherein the to-do list management system comprises:

list entry deletion logic configured to remove the given entry from the user's to-do list and generate an updated to-do list user interface without the given user actuatable list element corresponding to the given entry.

Example 15 is the computing system of any or all previous examples wherein the agenda management system comprises:

agenda item removal logic configured to remove the given agenda item from the user's agenda and generate an updated agenda interface without the given user actuatable agenda element corresponding to the given agenda item.

Example 16 is the computing system of any or all previous examples wherein the agenda management system comprises:

time suggestion logic that identifies a suggested time for adding the agenda item to the user's agenda for the given entry on the user's to-do list.

Example 17 is the computing system of any or all previous examples wherein the agenda interaction logic surfaces a user actuatable time selection element for each suggested time and detects user actuation of a given time selection element to select a time for the agenda item.

Example 18 is a computing system, comprising:

a to-do list management system configured to generate a user's to-do list on a to-do list user interface with a user actuatable list element corresponding to each list entry on the to-do list user interface;

an agenda management system configured to surface a user's agenda for the user on an agenda interface, with a user actuatable agenda element corresponding to each agenda item on the user's agenda;

to-do list interaction logic configured to detect a user flick gesture on a given user actuatable agenda element on the agenda interface corresponding to a given agenda item, and in response to the detected flick gesture on the agenda interface, generate a control signal to control the to-do list management system to add an entry on the user's to-do list, for the given agenda item on the user's agenda; and agenda interaction logic that detects a user flick gesture on a given user actuatable list element on the to-do list interface corresponding to a given entry on the user's to-do list, and in response to the detected flick gesture, generates a control signal to control the agenda management system to add an agenda item to the user's agenda, for the given entry on the user's to-do list corresponding to the given user actuatable list element.

Example 19 is the computing system of any or all previous examples wherein the agenda management system comprises:

time suggestion logic that identifies a suggested time for adding the agenda item to the user's agenda for the given entry on the user's to-do list, the agenda interaction logic being configured to generate a user actuatable time selection element for each suggested time and detect user actuation of a given time selection element to select a time for the agenda item.

Example 20 is the computing system of any or all previous examples wherein the agenda management system comprises:

agenda item ownership logic configured to identify a creator of each agenda item and generate an ownership indicator corresponding to each agenda item indicative of the identified creator of the corresponding agenda item, the to-do list interaction logic comprising ownership identifier logic configured to identify a creator of the given agenda item in response to detection of the flick gesture on the given user actuatable agenda element and to determine whether the creator of the given agenda item is the user, the to-do list interaction logic processing the flick gesture detected on the given user actuatable agenda element based on the determination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, configure the computing system to:
generate a to-do list user interface comprising:
a set of user actuatable list elements, each user actuatable list element corresponding to an entry on a to-do list associated with a user; and
user input mechanisms that are actuatable to perform to-do list management functions that include at least one of:
adding a new entry on the to-do list;
deleting an existing entry on the to-do list; or
modifying an existing entry on the to-do list;
generate an agenda associated with the user, the agenda comprising a set of agenda items, each agenda item assigned to a time period;
detect a user flick gesture on a given user actuatable list element on the to-do list user interface, the given user actuatable list element corresponding to a given entry on the to-do list associated with the user; and
add, based on the detected flick gesture, an agenda item to the agenda associated with the user, wherein the added agenda item corresponds to the given entry on the to-do list.

2. The computing system of claim 1 wherein the instructions configure the computing system to surface the agenda with an agenda interface that has a user actuatable agenda element corresponding to each agenda item on the agenda interface.

3. The computing system of claim 2 wherein the instructions configure the computing system to:
detect a user flick gesture on a given user actuatable agenda element on the agenda interface corresponding to a given agenda item, and
in response to the detected flick gesture on the agenda interface, generate a control signal to add an entry on the to-do list, for the given agenda item on the agenda.

4. The computing system of claim 3 wherein the instructions configure the computing system to:
list entry deletion logic configured to remove the given entry from the to-do list and generate an updated to-do list user interface without the given user actuatable list element corresponding to the given entry.

5. The computing system of claim 3 wherein the instructions configure the computing system to:
remove the given agenda item from the agenda and generate an updated agenda interface without the given user actuatable agenda element corresponding to the given agenda item.

6. The computing system of claim 5 wherein the instructions configure the computing system to:
identify a creator of each agenda item and generate an ownership indicator corresponding to each agenda item indicative of the identified creator of the corresponding agenda item.

7. The computing system of claim 5 wherein the instructions configure the computing system to:
identify a creator of the given agenda item in response to detection of the flick gesture on the given user actuatable agenda element;
determine whether the creator of the given agenda item is the user; and
process the flick gesture detected on the given user actuatable agenda element based on the determination.

8. The computing system of claim 7 wherein the instructions configure the computing system to inhibit removal of the given agenda item from the agenda in response to determining that the creator of the given agenda item is not the user.

9. The computing system of claim 1 wherein the instructions configure the computing system to:
identify a set of suggested times for the agenda item
surface a set of time display elements, representing the set of suggested times, and a time selection user input mechanism;
select one of the suggested times based on user actuation of the time selection user input mechanism; and
configure the agenda item, added to the agenda associated with the user, with the selected one of the suggested times.

10. The computing system of claim 9 wherein the instructions configure the computing system to:
identify the set of suggested times based on information that identifies free time slots in the agenda associated with the user.

11. A computing system, comprising:
at least one processor; and
memory storing instructions executable by the at least one processor, wherein the instructions, when executed, provide:
a to-do list management system configured to generate a representation of a to-do list, associated with a user, with a list entry corresponding to each entry on the to-do list;
an agenda management system configured to generate a representation of an agenda, associated with the user, on an agenda interface, with a user actuatable agenda element corresponding to each agenda item on the agenda; and
interaction logic configured to:
detect a user flick gesture on a given agenda element, on the agenda interface, corresponding to a given agenda item;
identify a creator of the given agenda item;
determine that the user corresponds to the creator of the given agenda item; and
in response to the detected user flick gesture and based on the determination that the user corresponds to the creator, generate a control signal to control the to-do list management system to add an entry to the to-do list, associated with the user, wherein the added entry to the to-do list corresponds to the given agenda item on the agenda.

12. The computing system of claim 11 wherein the to-do list management system is configured to surface the to-do list with the to-do list interface with a user actuatable list element corresponding to each list entry on the to-do list interface.

13. The computing system of claim 12 wherein the to-do list management system comprises:
agenda interaction logic that detects a user flick gesture on a given user actuatable list element on the to-do list interface corresponding to a given entry on the to-do list, and in response to the detected flick gesture, generates a control signal to control the agenda management system to add an agenda item to the agenda, for the given entry on the to-do list corresponding to the given user actuatable list element.

14. The computing system of claim 13 wherein the to-do list management system comprises:
list entry deletion logic configured to remove the given entry from the to-do list and generate an updated to-do list user interface without the given user actuatable list element corresponding to the given entry.

15. The computing system of claim 11 wherein the agenda management system comprises:
agenda item removal logic configured to remove the given agenda item from the agenda and generate an updated agenda interface without the given user actuatable agenda element corresponding to the given agenda item.

16. The computing system of claim 15 wherein the agenda item removal logic is configured to:
inhibit removal of the given agenda item from the agenda in response to determining that the creator of the given agenda item is not the user.

17. The computing system of claim 11, wherein
the agenda management system comprises:
time suggestion logic configured to identify a suggested time for adding the agenda item to the agenda for the given entry on the to-do list,
the agenda interaction logic is configured to surface a user actuatable time selection element for each suggested time and detects user actuation of a given time selection element to select a time for the agenda item.

18. A computing system, comprising:
at least one processor; and
memory storing instructions executable by the at least one processor, wherein the instructions, when executed, cause the computing system to:
generate a user's to-do list on a to-do list user interface with a user actuatable list element corresponding to each list entry on the to-do list user interface;
surface a user's agenda for the user on an agenda interface, with a user actuatable agenda element corresponding to each agenda item on the user's agenda;
detect a user flick gesture on a given user actuatable agenda element on the agenda interface corresponding to a given agenda item, and in response to the detected flick gesture on the agenda interface, add an entry on the user's to-do list, for the given agenda item on the user's agenda;
detect a user flick gesture on a given user actuatable list element on the to-do list interface corresponding to a given entry on the user's to-do list;
based on the detected flick gestures, add an agenda item to the user's agenda, for the given entry on the user's to-do list corresponding to the given user actuatable list element;
identify a set of suggested times for the agenda item based on information in the agenda associated with the user;
surface a set of time display elements, representing the set of suggested times, and a time selection user input mechanism;
select one of the suggested times based on user actuation of the time selection user input mechanism; and
configure the agenda item, added to the agenda associated with the user, with the selected one of the suggested times.

19. The computing system of claim 18 wherein the information identifies free time slots in the agenda associated with the user.

20. The computing system of claim 18 wherein the instructions cause the computing system to:

identify a creator of each agenda item and generate an ownership indicator corresponding to each agenda item indicative of the identified creator of the corresponding agenda item;

identify a creator of the given agenda item in response to detection of the flick gesture on the given user actuatable agenda element and to determine whether the creator of the given agenda item is the user; and process the flick gesture detected on the given user actuatable agenda element based on the determination.

* * * * *